US012810292B2

(12) United States Patent
Yoo

(10) Patent No.: US 12,810,292 B2
(45) **Date of Patent: *Nov. 24, 2026**

(54) METHOD AND SYSTEM FOR PROVIDING FINANCIAL TRANSACTION USING EMPTY CARD

(71) Applicant: SSenStone Inc., Seoul (KR)

(72) Inventor: Chang Hun Yoo, Seoul (KR)

(73) Assignee: SSenStone Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/966,648

(22) Filed: Dec. 3, 2024

(65) Prior Publication Data

US 2025/0094962 A1 Mar. 20, 2025

Related U.S. Application Data

(63) Continuation of application No. 17/841,502, filed on Jun. 15, 2022, now Pat. No. 12,182,796, which is a
(Continued)

(30) Foreign Application Priority Data

Aug. 9, 2018 (KR) ........................ 10-2018-0093349
Apr. 12, 2019 (KR) ........................ 10-2019-0043118
Apr. 29, 2019 (KR) ........................ 10-2019-0049624

(51) Int. Cl.
*G06Q 20/38* (2012.01)
*G06Q 20/34* (2012.01)
*G06Q 20/40* (2012.01)

(52) U.S. Cl.
CPC ......... *G06Q 20/385* (2013.01); *G06Q 20/341* (2013.01); *G06Q 20/351* (2013.01);
(Continued)

(58) Field of Classification Search
CPC .. G06Q 20/385; G06Q 20/341; G06Q 20/351; G06Q 20/354
See application file for complete search history.

(56) References Cited

U.S. PATENT DOCUMENTS 6,000,832 A 12/1999 Franklin et al.
8,401,904 B1 3/2013 Simakov et al.
(Continued)

FOREIGN PATENT DOCUMENTS

CN 101414370 A 4/2009
CN 103870957 A 6/2014
(Continued)

OTHER PUBLICATIONS

International Search Report issued in PCT/KR2019/009636; mailed Nov. 6, 2019.
(Continued)

*Primary Examiner* — Steven S Kim
(74) *Attorney, Agent, or Firm* — Studebaker Brackett PLLC

(57) ABSTRACT

A method and a system for providing a financial transaction using an empty card are provided. The method for providing a financial transaction using an empty card includes receiving, by a server, a virtual card number generated by a program included in a user terminal, searching, by the server, for an empty card storage location at which the empty card is registered, in a storage location search algorithm based on the virtual card number, searching, by the server, for a real card number storage space linked to a user identification (UID) assigned to the found empty card storage location, extracting, by the server, a real card number stored in the real card number storage space, and perform-
(Continued)

ing, by the server, a financial transaction progress or a financial transaction progress request with the extracted real card number.

7 Claims, 14 Drawing Sheets

Related U.S. Application Data continuation of application No. 16/511,449, filed on Jul. 15, 2019, now Pat. No. 11,392,931.

(52) U.S. Cl.
CPC ....... *G06Q 20/354* (2013.01); *G06Q 20/3567* (2013.01); *G06Q 20/38* (2013.01); *G06Q 20/409* (2013.01)

(56) References Cited

U.S. PATENT DOCUMENTS

| | | | | |
|---|---|---|---|---|
| 8,768,830 | B1 | 7/2014 | Jorgensen et al. | |
| 10,754,942 | B2 | 8/2020 | Yoo | |
| 11,188,895 | B2 | 11/2021 | Yoo | |
| 11,354,401 | B2 | 6/2022 | Yoo | |
| 11,392,931 | B2 | 7/2022 | Yoo | |
| 11,609,983 | B2 | 3/2023 | Yoo | |
| 11,816,657 | B2 | 11/2023 | Yoo | |
| 12,182,796 | B2 * | 12/2024 | Yoo | G06Q 20/354 |
| 2001/0047335 | A1 | 11/2001 | Arndt et al. | |
| 2002/0116330 | A1 | 8/2002 | Hed et al. | |
| 2008/0319905 | A1 | 12/2008 | Carlson | |
| 2009/0048971 | A1 | 2/2009 | Hathaway et al. | |
| 2011/0101093 | A1 | 5/2011 | Ehrensvard | |
| 2011/0103214 | A1 | 5/2011 | Yamaoka et al. | |
| 2011/0246317 | A1 | 10/2011 | Coppinger | |
| 2011/0320345 | A1 | 12/2011 | Taveau et al. | |
| 2012/0041881 | A1 | 2/2012 | Basu et al. | |
| 2012/0129450 | A1 | 5/2012 | Lee | |
| 2014/0141844 | A1 | 5/2014 | Golla et al. | |
| 2014/0172700 | A1 | 6/2014 | Teuwen et al. | |
| 2014/0195429 | A1 | 7/2014 | Paulsen | |
| 2014/0258135 | A1 | 9/2014 | Park et al. | |
| 2014/0291406 | A1 | 10/2014 | Ko | |
| 2014/0359714 | A1 | 12/2014 | Pluss et al. | |
| 2015/0134540 | A1 | 5/2015 | Law et al. | |
| 2015/0162954 | A1 | 6/2015 | Socol et al. | |
| 2015/0180836 | A1 | 6/2015 | Wong et al. | |
| 2015/0287029 | A1 | 10/2015 | Park et al. | |
| 2016/0132865 | A1 | 5/2016 | Park et al. | |
| 2017/0195320 | A1 | 7/2017 | Yoo et al. | |
| 2017/0286946 | A1 | 10/2017 | Miao et al. | |
| 2017/0300894 | A1 * | 10/2017 | Shanmugam | G06Q 20/24 |
| 2017/0330173 | A1 | 11/2017 | Woo et al. | |
| 2018/0039987 | A1 | 2/2018 | Molino | |
| 2018/0189002 | A1 | 7/2018 | Seo | |
| 2018/0300712 | A1 | 10/2018 | Kim et al. | |
| 2019/0012658 | A1 | 1/2019 | Liu et al. | |
| 2019/0050556 | A1 | 2/2019 | Yoo | |
| 2019/0050849 | A1 | 2/2019 | Yoo | |
| 2019/0050933 | A1 | 2/2019 | Yoo | |
| 2019/0114619 | A1 | 4/2019 | Wilson | |
| 2019/0303945 | A1 | 10/2019 | Mitra et al. | |
| 2020/0034830 | A1 | 1/2020 | Ortiz et al. | |
| 2020/0051075 | A1 | 2/2020 | Yoo | |
| 2020/0320526 | A1 | 10/2020 | Yoo | |
| 2020/0342445 | A1 | 10/2020 | Yoo | |

FOREIGN PATENT DOCUMENTS

| | | | |
|---|---|---|---|
| CN | 106779705 | A | 5/2017 |
| JP | 2002-56332 | A | 2/2002 |
| JP | 2002-157421 | A | 5/2002 |
| JP | 2002-298055 | A | 10/2002 |
| JP | 2004-274429 | A | 9/2004 |
| JP | 2008-204248 | A | 9/2008 |
| JP | 2015-510628 | A | 4/2015 |
| JP | 2016-009375 | A | 1/2016 |
| JP | 2016-500182 | A | 1/2016 |
| JP | 2017-033190 | A | 2/2017 |
| JP | 2018-506102 | A | 3/2018 |
| JP | 2018-507582 | A | 3/2018 |
| KR | 10-2005-0105432 | A | 11/2005 |
| KR | 10-2008-0087935 | A | 10/2008 |
| KR | 101051420 | B1 | 7/2011 |
| KR | 10-2012-0014447 | A | 2/2012 |
| KR | 101316466 | B1 | 10/2013 |
| KR | 10-2015-0032682 | A | 3/2015 |
| KR | 10-2015-0072955 | A | 6/2015 |
| KR | 10-2015-0106198 | A | 9/2015 |
| KR | 10-2016-0036471 | A | 4/2016 |
| KR | 10-2016-0082100 | A | 7/2016 |
| KR | 10-1675927 | B1 | 11/2016 |
| KR | 10-2017-0040469 | A | 4/2017 |
| KR | 10-2017-0043377 | A | 4/2017 |
| KR | 10-1751894 | B1 | 7/2017 |
| KR | 10-2017-0126688 | A | 11/2017 |
| KR | 102308529 | B1 | 10/2021 |
| TW | 201804384 | A | 2/2018 |
| WO | 2013/001967 | A1 | 1/2013 |
| WO | 2015/182607 | A1 | 12/2015 |
| WO | 2017/157185 | A1 | 9/2017 |

OTHER PUBLICATIONS

Notice of Eligibility for Grant issued by the Intellectual Property Office of Singapore in connection with Singapore Patent Application No. 10201906988P which is related to U.S. Appl. No. 16/511,449.

FPC1020; Jun. 1, 2016, non-official translation (Daum blog. FPC1020 Touch Fingerprint Sensor in Kona-I Smartcard; Daum blog. FPC1020; retrieved on Oct. 14, 2019; retrieved from http:/blog.daum.net/_blog/BlogTypeView.do?blogid=Oldbt&articleno=7594448&categoryId=404979&regdt =20160601184 721>; pp. I-15.

[Swyp] Mar. 8, 2015; non-official translation (Naver blog. [Swyp] An Electronic Card for Those Who Own Multiple Cards). [retrieved on Oct. 14, 20J 9]; Retrieved from <https://blog.naver.com/van590/220294049107>; pp. I-2.

Intellectual Property Office of Singapore Search Report; issued in SG 10201906988P; completed Dec. 26, 2019.

Communication pursuant to Article 94(3) EPC issued by the European Patent Office on Jul. 6, 2021, which corresponds to European Patent Application No. 19 186 458.6-1213 and is related to U.S. Appl. No. 16/511,449.

Search Report issued by Intellectual Property Office of Singapore in SG 10202002346Q; completed Nov. 9, 2021.

An Office Action; "Notice of Reasons for Refusal," mailed by the Japanese Patent Office on May 26, 2020, which corresponds to Japanese Patent Application No. 2019-144690 and is related to U.S. Appl. No. 16/511,449 ; with English language translation.

An Office Action; "Notice of Reasons for Refusal," mailed by the Japanese Patent Office on Mar. 29, 2022, which corresponds to Japanese Patent Application No. 2021-007894; with English language translation.

A Notice of preliminary examination result by the Korean Patent Office on Jun. 21, 2022, which corresponds to Korean Patent Application No. 10-2021-0127798 with English Translation.

A Notice of preliminary examination result by the Korean Patent Office on Jul. 25, 2022, which corresponds to Korean Patent Application No. 10-2022-0060613 with English Translation.

A written opinion and search report issued by the Intellectual Property Office of Singapore on May 17, 2024, which corresponds to Singapore Patent Application No. 10202251471S.

An Office Action mailed by the Japanese Patent Office on Dec. 26, 2023, which corresponds to Japanese Application No. 2022-176291 with English translation.

* cited by examiner

FIG. 1
Empty card
[10]
User terminal
[20]
Server
[30]

METHOD AND SYSTEM FOR PROVIDING FINANCIAL TRANSACTION USING EMPTY CARD

CROSS-REFERENCE TO RELATED APPLICATIONS

The present application is a Continuation of U.S. patent application Ser. No. 17/841,502, filed on Jun. 15, 2022, which is a Continuation of U.S. patent application Ser. No. 16/511,449, filed on Jul. 15, 2019 which is based upon and claims the benefit of priority under 35 U.S.C. § 119 to Korean Patent Application Nos. 10-2018-0093349 filed on Aug. 9, 2018, 10-2019-0043118 filed on Apr. 12, 2019, and 10-2019-0049624 filed on Apr. 29, 2019 in the Korean Intellectual Property Office, the entire contents of which are hereby incorporated by reference.

BACKGROUND

Embodiments of the inventive concept described herein relate to a method and a system for providing financial transaction using an empty card, and more particularly, relate to a method and a system for providing a financial transaction using an empty card, which generate a virtual card number generated not to be redundant at each time point, search for a real card number based on the generated virtual card number, and perform the financial transaction.

Data of a code type is used in many fields. In addition to the card number and account number used to make a payment, the data of a code type includes an IPIN number and a resident registration number for user identification.

However, the code data may be leaked when this code data is used. In the case of a card number, because the real card number is recorded on the card surface as it is, the real card number is visually exposed to other people. Upon making a payment using a magnet, the card number is leaked to other people while being transmitted to a POS device.

The virtual card number was used to prevent the real card number from being leaked. However, data for identifying a user is needed to search for the real card number corresponding to the virtual card number. For example, the code of One Time Password (OTP) is changed and generated every time. However, in the case of OTP, a login procedure is needed to determine the algorithm assigned to the user, and it is difficult for OTP to be applied to various areas.

Accordingly, there is a need for a device capable of searching for the real card number based on the virtual card number changed in real time, while not providing the identification information about a user or a device corresponding to the real card number.

SUMMARY

The inventive concept provides a method and a system for providing a financial transaction using an empty card that search for a real card number registered in the empty card from a virtual card number generated based on empty card data, without the exposure of real card information, which is used in a financial transaction at a finance company (e.g., a card issuer or a bank).

Moreover, the inventive concept provides a method and a system for providing a financial transaction using an empty card that provides a virtual card number that is newly generated at a unit count interval while not being generated redundantly, whenever the payment using the empty card is requested.

Furthermore, the inventive concept provides a method and a system for providing a financial transaction using an empty card that employ the selected one as one empty card, and performs a financial transaction by using the empty card such that a real credit card number is not exposed at all after a user selects one of among a plurality of credit cards held by a user.

The technical objects of the inventive concept are not limited to the above-mentioned ones, and the other unmentioned technical objects will become apparent to those skilled in the art from the following description.

In accordance with an aspect of the inventive concept, there is provided a method for providing a financial transaction using an empty card comprising receiving, by a server, a virtual card number generated by a program included in a user terminal, searching, by the server, for an empty card storage location at which the empty card is registered, in a storage location search algorithm based on the virtual card number, searching, by the server, for a real card number storage space linked to a user identification (UID) assigned to the found empty card storage location, extracting, by the server, a real card number stored in the real card number storage space, and performing, by the server, a financial transaction progress or a financial transaction progress request with the extracted real card number. The virtual card number is generated by a virtual card number generating function in the program, based on empty card data provided from the empty card of a user through wireless communication, and the empty card includes specific empty card data provided given at a time of manufacture. The storage location search algorithm is matched to the virtual card number generating function, and searches for the empty card storage location based on at least one detailed code in the virtual card number.

In accordance with another aspect of the inventive concept, there is provided a program for providing a financial transaction using an empty card, which is coupled to a computer that is a piece of hardware and is stored in a medium to execute the method.

In accordance with another aspect of the inventive concept, there is provided a virtual card number generating device using an application comprising a detailed code generating unit generating one or more detailed codes based on empty card data provided through wireless communication from an empty card of a user, a virtual card number generating unit generating a virtual card number by combining the one or more detailed codes using a virtual card number generating function, and a virtual card number providing unit transmitting the generated virtual card number to a server to make a payment request. The virtual card number is generated based on time data in which the empty card data is received from the empty card or time data in which the payment request is made, and a combination serial number obtained by combining an empty card serial number included in the empty card data and an application serial number included in the application, and the server is configured to search for an empty card storage location, at which the empty card is registered, in a storage location search algorithm matched to the virtual card number generating function based on the virtual card number provided by the virtual card number providing unit, to search for a real card number storage space linked to a UID assigned to the empty card storage location, and to extract a real card number stored in the real card number storage space to perform a financial transaction progress or a financial transaction progress request.

In accordance with another aspect of the inventive concept, there is provided a virtual card number verifying device providing a financial transaction by using a real card number extracted based on a virtual card number comprising a virtual card number receiving unit receiving the virtual card number from a user terminal, a detailed code extracting unit extracting one or more detailed codes included in the virtual card number, a storage location search unit searching for an empty card storage location, at which the empty card is registered, in a storage location search algorithm based on the extracted one or more detailed codes, a real card number extracting unit searching for a real card number storage space linked to a UID assigned to the found empty card storage location and extracting a real card number stored in the found real card number storage space, and a financial transaction requesting unit performing a financial transaction progress or a financial transaction progress request, using the extracted real card number. the virtual card number is generated based on empty card data provided through wireless communication from an empty card of a user by a virtual card number generating function in the user terminal, and the storage location search algorithm is matched to the virtual card number generating function.

In accordance with another aspect of the inventive concept, there is provided an empty card device for a financial transaction comprising an IC chip including empty card data and a communication unit providing the empty card data to a user terminal through wireless communication. The empty card data is specific data assigned to the empty card device when the empty card device is manufactured. The user terminal is configured to generate a virtual card number based on the received empty card data, using a virtual card number generating function and to provide the generated virtual card number to a server. The server is configured to search for an empty card storage location, at which the empty card is registered, in a storage location search algorithm matched to the virtual card number generating function based on the received virtual card number, to search for a real card number storage space linked to a UID assigned to the empty card storage location, and to extract a real card number stored in the real card number storage space to perform a financial transaction progress or a financial transaction progress request.

The other detailed items of the inventive concept are described and illustrated in the specification and the drawings.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
FIG. 1 is a block diagram of a financial transaction providing system using an empty card, according to an embodiment of the inventive concept.

The above and other aspects, features and advantages of the invention will become apparent from the following description of the following embodiments given in conjunction with the accompanying drawings. However, the inventive concept is not limited to the embodiments disclosed below, but may be implemented in various forms. The embodiments of the inventive concept are provided to make the disclosure of the inventive concept complete and fully inform those skilled in the art to which the inventive concept pertains of the scope of the inventive concept.

The terms used herein are provided to describe the embodiments but not to limit the inventive concept. In the specification, the singular forms include plural forms unless particularly mentioned. The terms “comprises” and/or “comprising” used herein does not exclude presence or addition of one or more other elements, in addition to the aforementioned elements. Throughout the specification, the same reference numerals dente the same elements, and “and/or” includes the respective elements and all combinations of the elements. Although “first”, “second” and the like are used to describe various elements, the elements are not limited by the terms. The terms are used simply to distinguish one element from other elements. Accordingly, it is apparent that a first element mentioned in the following may be a second element without departing from the spirit of the inventive concept.

Unless otherwise defined, all terms (including technical and scientific terms) used herein have the same meaning as commonly understood by those skilled in the art to which the inventive concept pertains. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

Hereinafter, exemplary embodiments of the inventive concept will be described in detail with reference to the accompanying drawings.

In this specification, 'financial transaction' refers to the procedure that takes place with a finance company. The 'financial transaction' includes card payments, deposits or withdrawals from a bank account, or the like.

In this specification, 'character' is a component of a code and includes all or part of uppercase alphabet characters, lowercase alphabet characters, numerals, and special characters.

In this specification, a 'code' refers to a string of characters.

In this specification, an 'empty card' is a separate card distinguished from the user's real card, and is a card including a separate card number or an identification number (e.g., a serial number).

In this specification, an 'empty card number' refers to the card number provided to the empty card. For example, the 'empty card number' is the card number to be provided to a POS device when the user makes an offline payment with his/her empty card.

In this specification, the 'real card number' is the number provided to the real card of a specific user by a finance company or card issuer, and refers to the number provided to a general physical card, a mobile card, or the like.

In this specification, a 'virtual card number' is the number generated based on the information provided from the empty card by the virtual card number generating means, and is the card number used to search for the real card number by the virtual card number verifying means. That is, the 'virtual card number' is the virtual card number temporarily provided for each unit count to search for the real card number.

In this specification, a 'detailed code' refers to a part of codes included in the virtual card number.

In this specification, the 'unit count' is a unit set to a specific time interval and is defined to change as the time interval elapses. For example, 1 count may be used after being set to a specific time interval (e.g., 1.5 seconds).

In this specification, a 'virtual card number generating function' refers to the function used to generate the virtual card number.

In this specification, 'cloud movement' means that an object performs both rotational and translational movements. That is, 'cloud movement' moves while performing both rotational and translational movements, and means that each point of the rotating object moves in contact with the moving axis sequentially.

In this specification, 'substitute card number' refers to a card number for substitute that is linked to a real card number to automatically pay a regularly charged fee when a specific service is used.

Hereinafter, according to an embodiment of the inventive concept, the configuration of the real card number will be described to explain the process of generating a virtual card number to substitute the real card number and the process of searching for a real card number.

The real card number includes at least one of a card identification number, a card security code, or an expiration date. The card identification number is the code assigned to identify a card issuer, a card type, and a user of a card. Generally, the card identification number assigned to a card has 15 or 16 digits. Moreover, in general, in the case of the card identification number of 16 digits, the first six digits are composed of the issuer identification number (IIN) of the card; the digits from the seventh digit to the fifteenth digit are composed of code provided by each card issuer to each card depending on an arbitrary rule; the 16th digit is composed of a value for verifying the card identification number by a specific formula.

The card security code is composed of the specific numbers on digits (e.g., 3 digits in the case of Visa or Master card, 4 digits in the case of Amex card) printed on one side of the card, and is a code for determining whether the card number is normal. That is, in the case where the card security code is 3 digits and the card identification number is 16 digits, when 3-digit code being the card security code and 16-digit code being the card identification number are encrypted/decrypted depending on a predetermined rule and then the corresponding value is matched, the card is a normal card. The card security code is known as many names, and is called a Card Verification Value (CVV) for Visa, Card Validation Code (CVC) for Master Card/JCB, and Confidential Identifier Number or Card Identification Number (CID) for American Express.

The expiration date refers to the date usable after which the real card number is issued. Generally, the expiration date is composed of four digits having two digits for each year and month.

Because the magnetic card includes the real card number as it is, the whole card number may be leaked by only reading out the magnetic card. The use of magnetic cards has been recently restricted over the world, and the magnetic card is being converted into a high-security card like an IC card. For the purpose of applying other high-security methods, a new terminal needs to be installed or the magnetic card needs to be changed to be different from the conventional process. Accordingly, a method for preventing a card number leakage is needed while the same process is applied using the conventional real card number. In particular, it is necessary to improve security while the conventional magnetic card reader is used as it is.

Hereinafter, embodiments of the inventive concept will be described in detail with reference to accompanying drawings.

Figure 2:
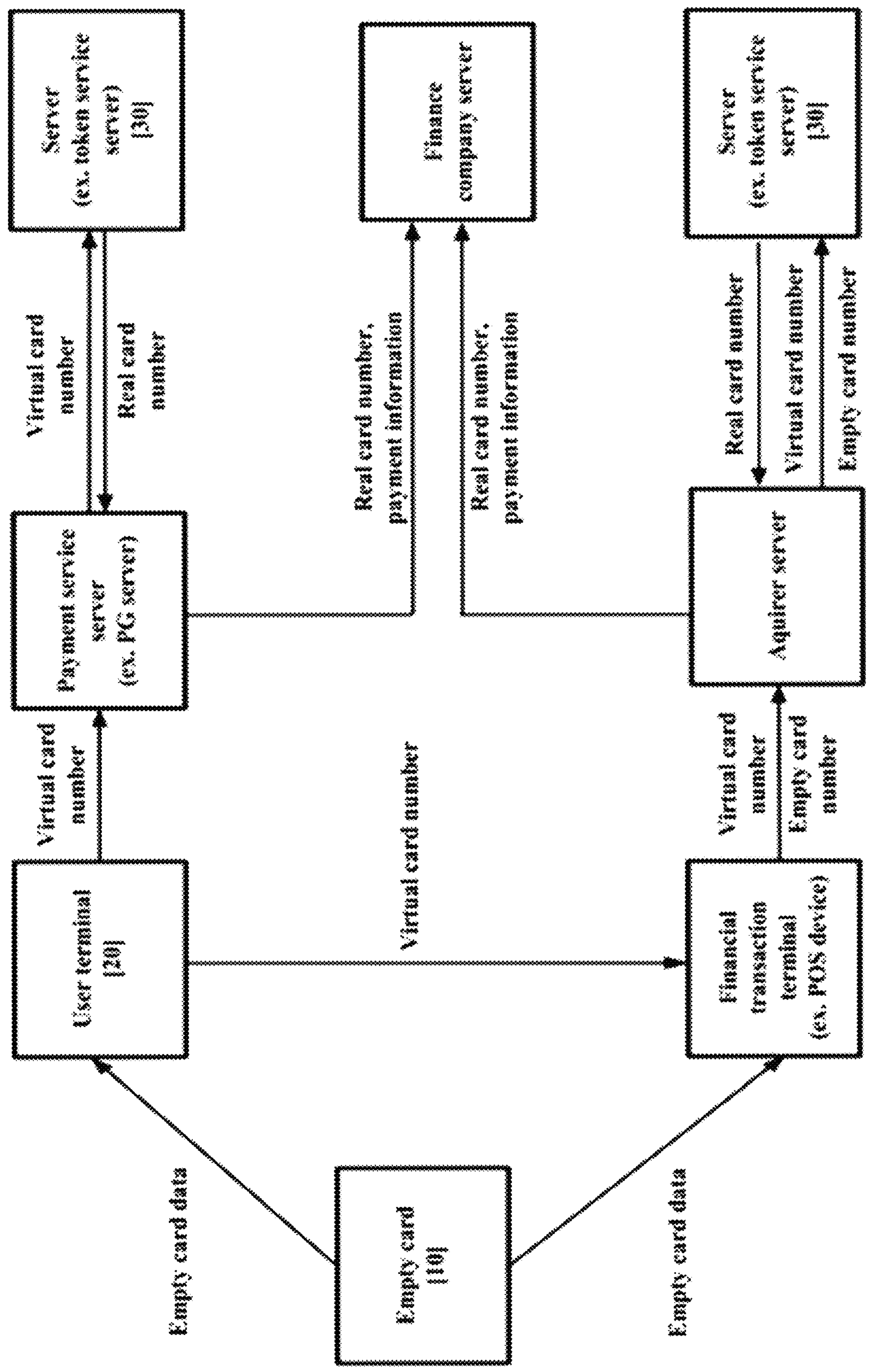
FIG. 2 is a block diagram illustrating an online and offline financial transaction process using an empty card, according to an embodiment of the inventive concept.

FIG. 1 is a block diagram of a financial transaction providing system using an empty card, according to an embodiment of the inventive concept. FIG. 2 is a block diagram illustrating an online and offline financial transaction process using an empty card, according to an embodiment of the inventive concept.

As illustrated in FIG. 1, a financial transaction providing system may be composed of an empty card 10, a user terminal 20, and a server 30.

The empty card 10 transmits information included in the empty card 10, to the user terminal 20 or is used for payment like real cards upon making an offline payment. Each empty card is linked to one or more real card numbers, and is a card that enables financial transactions without exposing the real card number upon making a request for the payment.

In an embodiment, as the empty card 10 communicates with the user terminal 20, the empty card 10 transmits information necessary to generate a virtual card number. For example, as the empty card 10 communicates with the user terminal 20 through Near Field Communication (NFC), when the empty card 10 is in contact with one side of the user terminal 20, the empty card 10 transmits data included in the empty card 10, to the user terminal 20. Hereinafter, a method in which the user terminal 20 uses the data provided by the empty card 10 will be described in detail.

Moreover, as illustrated in FIG. 2, when making an offline payment with the empty card 10 through a general POS device (e.g., a device with a function to make a payment using a magnetic stripe, a payment using an IC chip, or a payment using an NFC), the empty card 10 may be used for direct payment. That is the, the empty card 10 may be used in the same way as the offline payment execution method of a general real card. For example, because an empty card number is linked to a 'real card number', when a user makes a request for a payment using an empty card, a server (e.g., a finance company server in the case where a finance company or a card issuer provides a service or a token service server in the case where a token service provider provides a service) may request or perform a financial transaction with the real card number linked to the corresponding empty card number.

The empty card 10 is linked to one or more real cards held by the user in the server 30. For example, the empty card number is linked to the area where the real card number in the server 30 is stored, and the count at which the empty card is registered in the server may be linked to the area where the real card number is stored.

Furthermore, in an embodiment, the empty card 10 may be registered in the server 30 for the first time by a dedicated application installed or included in the user terminal 20. The method for the initial registration of the empty card 10 in the server 30 will be described in detail later.

Moreover, in an embodiment, the empty card 10 may be purchased separately by a user or received by a finance company, and then may be used by the user in connection with a real card number. For example, the user may purchase and use an empty card of the desired design at a mart or convenience store. Furthermore, for example, when a specific finance company or card issuer provides the services such that the user conveniently uses a plurality of cards issued by the specific finance company or card issuer, the user may receive and use the empty card from the finance company or card issuer. At this time, the user may use the empty card in connection with a plurality of real card numbers issued by the specific finance company or card issuer.

Furthermore, in an embodiment, an empty card data including an empty card number, an empty card serial number, or the like is provided to the empty card 10 at the time of manufacture. Furthermore, in an embodiment, the empty card 10 only includes empty card data therein and does not expose the empty card data (e.g., the empty card number) to the outside.

The user terminal 20 is the mobile terminal of the user who purchases and uses the empty card 10. The dedicated program or the dedicated application (hereinafter referred to as an "empty card-dedicated program 21) for an empty card-based payment service may be embedded or installed in the user terminal 20.

In an embodiment, the empty card-dedicated program 21 may receive the empty card data by communicating with the empty card. That is, the user terminal 20 receives the empty card data by performing wireless communication (e.g., NFC communication according to proximity) with the empty card 10.

Furthermore, in an embodiment, the empty card-dedicated program 21 generates a virtual card number for performing a financial transaction using the empty card data received from the empty card. That is, the empty card-dedicated program 21 includes the virtual card number generating function to generate the virtual card number using all or part of the empty card data received from the empty card. For example, the empty card-dedicated program 21 generates a virtual card number by using the empty card serial number included in the empty card data as the seed data of the virtual card number generating function. Furthermore, for example, the empty card-dedicated program 21 may use the combination serial number that combines the empty card serial number received from the empty card with the serial number of the dedicated program, as the seed data of the virtual card number generating function.

Furthermore, in an embodiment, the empty card-dedicated program 21 registers the empty card newly obtained by the user, in the server 30. That is, the user purchases or receives the empty card 10 and then registers the empty card 10 in the empty card-dedicated program 21 installed in the user terminal 20; the empty card-dedicated program 21 transmits the empty card data to a server and thus the empty card 10 may be registered in the server.

As a specific example, the empty card-dedicated program 21 receives the empty card data including the serial number and the empty card number from the empty card 10 upon registering the empty card. Afterward, the empty card-dedicated program 21 transmits the empty card number to the server 30. When the server 30 registers the empty card 10 at a specific count, the empty card-dedicated program 21 receives a virtual card number generating function or setting data for specifying the virtual card number generating function, from the server 30. For example, the empty card-dedicated program 21 receives the User ID (UID) code assigned to the specific count, at which the empty card A held by a user 1 is registered, as the setting data from the server and sets the virtual card number generating function for the empty card A of the user 1 by applying the UID received as the setting data to the virtual card number generating function. As such, the empty card-dedicated program 21 includes a virtual card number generating function for generating a virtual card number capable of searching for a specific count at which an empty card is registered in the server 30.

In an embodiment, when a user requests a dedicated program to generate a virtual card number by using an unregistered empty card, that is, when the empty card 10 used for the payment request by the user is not the card registered in the server 30 via the dedicated program 21, the dedicated program 21 may notify the user of an error message by displaying the error message of "this is not the registered empty card. It is impossible to make a payment." on the screen of the user terminal 20.

To this end, the dedicated program may internally store the empty card serial number. At this time, i) the dedicated program stores the empty card serial number in a terminal but generates the virtual card number only when the serial number is received from the empty card (i.e., the first mode) and ii) the dedicated program may generate a virtual card number without receiving the empty card serial number from the empty card as the dedicated program is configured to use the empty card serial number stored at the time of registration as it is when the virtual card number is generated.

Furthermore, in an embodiment, the empty card-dedicated program 21 not only generates a virtual card number (i.e., a virtual card number for an instant payment) for making an instant payment, but also generates a virtual card number (i.e., a virtual card number or a substitute card number for regular payment) for making a regular payment at the request of the user. That is, the empty card-dedicated program 21 may be changed in real time upon making an instant payment. However, a server generates a real card number and generates a substitute card number that is a fixed virtual card number linked to the real card number used by the user to make a specific regular payment upon making a regular payment. When using a substitute card number-based service, the dedicated program 21 generates a new substitute card number by communicating with the service server and links the real card number stored in the server, to the substitute card number.

In particular, when the user requests the registration of a regular payment service, the dedicated program 21 embedded or installed in the user terminal 20 may generate the substitute card number for regular payment. For example, when the user needs to make regular payments once a month to use the music streaming service, the user provides the substitute card number generated by the dedicated program 21 to the corresponding music streaming app such that the regular payment is made automatically. That is, when the music streaming service server provides a payment gateway (PG) server with the substitute card number provided by the user every regular payment date, the PG server provides the substitute card number to the server 30, and the server 30 extracts a real card number linked to the provided substitute card number and then makes a payment or makes a request for a payment progress.

At this time, like the real card number, the substitute card number is composed of 15 or 16 digits. For example, in the case where the substitute card number is composed of 16 digits, the first six digits are composed of the IIN of the card; the digits from the seventh digit to the fifteenth digit are composed of code provided by each card issuer to each card depending on an arbitrary rule; the 16th digit is composed of a value for verifying the substitute card number by a specific formula. Herein, because the IIN includes information about a card issuer and a card type, the PG server may grasp the IIN and then may request the corresponding card issuer or finance company to make a payment, when receiving a payment request.

Furthermore, in an embodiment, the dedicated program 21 may generate different substitute card numbers for each service type at the request of the user and may match and store substitute card numbers corresponding to the respective types. For example, when the user registers a regular payment service to use a music streaming service, a video streaming service, or an e-book service, the dedicated program 21 generates a substitute card number corresponding to each service and links the real card number to each substitute card number such that the regular payment is made.

At this time, the real card number linked to the substitute card number is selected by the server 30 or the user among one or more real card numbers registered in the server 30. Alternatively, the real card number set as the default card in the server 30 may be set automatically. Furthermore, the real card number linked to each substitute card number may be set identically by the server 30 or the user or may be set differently for each service type.

As such, in a situation where the expiration of the effective period of the real card, the closure of the real card, the re-issuance due to real card loss, or the like as the user employs an empty card number for regular payment, without the change of the real card number in all regular payment services, only the real card number linked to the substitute card number in the service connected to the dedicated program may be changed such that a normal payment progress is performed. For example, when the user cannot use the real card number registered in a specific substitute card number anymore, the user may connect another real card number registered in advance, to the substitute card number or may register a new real card number and then link the new real card number to the substitute card number. Furthermore, as the user employs the service based on the empty card-dedicated program, the user may easily set up a monthly financial plan to perform card performance condition management, or the like.

Furthermore, in another embodiment, the user may set the expiration date of the substitute card number generated for the specific service type, through the dedicated program 21. That is, when the substitute card number for a specific service is generated by the user's regular payment service registration request, the user may set the expiration date of the corresponding substitute card number. For example, when the user sets the expiration date of the substitute card number for the music streaming service to one month, as the service server deletes the real card number that has been linked to the corresponding substitute card number after the expiration date has elapsed or does not provides the real card number to the payment process anymore, the financial transaction may not be performed.

Furthermore, in an embodiment, the user may set the limit of the substitute card number generated for the specific service type, through the dedicated program 21. That is, the user may set the monthly charge for a specific service to the limit of the substitute card number. As such, it is possible to prevent the charge from being paid in duplicate or it is possible to prevent a payment from being made over a predetermined charge.

As illustrated in FIG. 2, the server 30 extracts the real card number linked to the empty card 10 of the user, based on the virtual card number provided by the user terminal 20 or the empty card number provided through a POS device to perform a financial transaction. The detailed description about the method of searching for the real card number based on the virtual card number or the empty card number in the server 30 will be described later.

Herein, the server 30 may be the server of a finance company that directly performs a financial transaction or may be a token service server requesting the finance company to perform a financial transaction. For example, when the server 30 is a finance company issuing one or more real credit cards, the server 30 may search for a specific real card number using the virtual card number or the empty card number and then may directly perform a financial transaction. At this time, the finance company server may register only the real card issued by the corresponding finance company in the service and then may use the real card. Furthermore, for example, the server 30 may be a server (i.e., a token service server) of a company operating a token service. At this time, as illustrated in FIG. 2, the token service server may search for the real card number based on the virtual card number, may provide the real card number to the payment process (i.e., provide a PG server or an acquirer server), and may allow the payment to proceed with the real card number.

Furthermore, in an embodiment, the server 30 performs the initial registration of the empty card based on the empty card data provided from the empty card-dedicated program 21. The method of initially registering an empty card in the server will be described in detail later.

Furthermore, in an embodiment, the server 30 stores one or more real card numbers provided via wireless communication from the empty card-dedicated program 21. A detailed description about a method of storing the real card number in the server and the internal structure for storing the real card number will be described in detail later.

Furthermore, in an embodiment, when a plurality of real card numbers are linked to a specific empty card, the server 30 sets a basic card (e.g., a default card) to be used to make a payment using an empty card through the user terminal 20 at the request of the user. The detailed description about a method of setting a basic card (e.g., a default card) of a plurality of real card numbers will be described in detail later.

Figure 3:
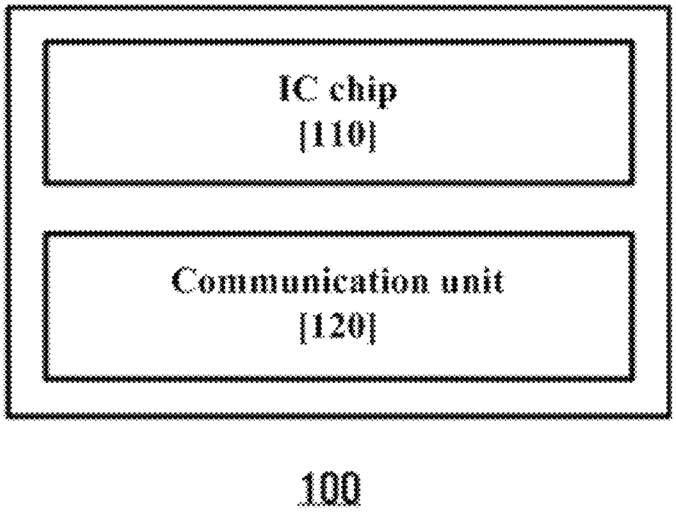
FIG. 3 is a block diagram of an empty card device, according to an embodiment of the inventive concept.

FIG. 3 is a block diagram of an empty card device, according to an embodiment of the inventive concept.

As illustrated in FIG. 3, an empty card device 100 includes an IC chip 110 and a communication unit 120.

Herein, the empty card device 100 refers to the empty card 10 contacting a virtual card number generating device 200 for a financial transaction.

The IC chip 110 is a metal chip disposed on the front surface of the empty card device 100 and includes empty card data of the empty card device 100. Herein, the empty card data refers to data including an empty card number, an empty card serial number, or the like.

Furthermore, the IC chip 110 makes a payment of IC type to a POS device. In particular, referring to FIG. 2, as the empty card device 100 is inserted into an IC-based POS device, the IC chip 110 contacts the POS device, and the empty card device 100 transmits the empty card data (i.e., an empty card number) stored therein to the POS device to perform an offline payment.

In an embodiment, the empty card device 100 may include a magnetic field generating unit (not illustrated). The magnetic field generating unit transmits the empty card number output in the form of a magnetic signal, to the POS device through a card reader to perform an offline payment. The magnetic field generating unit may include one or more magnetic cells that forms a magnetic field through current flow and outputs a magnetic signal of the empty card number. The magnetic field generating unit may be provided such that the magnetic field generating unit is exposed on the upper or lower surface of a PCB plate along a long side so as to be adjacent to the specific long side of the PCB plate of the empty card.

In another embodiment, the empty card device 100 may include a fingerprint recognition unit (not illustrated) capable of recognizing the fingerprint of the user. That is, in a state where the user places a finger (e.g., a thumb) on the fingerprint recognizing unit disposed at the location facing the IC chip 110 upon making an offline payment, the user inserts the portion where the IC chip 110 is positioned on the empty card device 100, into the POS device. As such, an electrical signal may be provided through the IC chip 110 to allow the fingerprint recognizing unit to recognize the fingerprint of the user's finger. Afterward, the fingerprint recognizing unit determines whether the recognized fingerprint is the same as the previously registered fingerprint of the user; when two fingerprints are the same as each other, the fingerprint recognizing unit approves to make a payment; otherwise, the fingerprint recognizing unit may not transmit the empty card number to the POS device such that the payment is not made. Accordingly, upon making an offline payment, the security may be improved by identifying the fingerprint of the user to make a payment.

At this time, for the purpose of initially registering the user's fingerprint, the empty card device 100 may be delivered while being connected to a shipping case including a battery. That is, when a user receives or purchases an empty card, the empty card device 100 is connected to a disposable battery embedded in the shipping case, and the user may register a fingerprint in a fingerprint recognizing unit, using an electrical signal supplied via a disposable battery.

The communication unit 120 communicates with the virtual card number generating device 200 to provide empty card data. Herein, in addition to Near Field Communication (NFC), the wireless communication scheme of the communication unit 120 may include Bluetooth, Bluetooth Low Energy (BLE), Beacon, Radio Frequency Identification (RFID), Infrared Data Association (IrDA), Ultra Wideband (UWB), ZigBee, or the like.

As a specific example, the communication unit 120 may be an NFC communication unit (e.g., an NFC antenna) connected to the IC chip 110. That is, as illustrated in FIG. 2, as the empty card device 100 approaches the virtual card number generating device 200 in which NFC communication is possible, the empty card device 100 may transmit the empty card data stored in the IC chip 110, to the user terminal 20. As such, the empty card-dedicated program 21 in the user terminal 20 may perform a procedure of generating a virtual card number based on the empty card data or of registering the empty card 10 in the server 30.

As illustrated in FIG. 2, the user terminal 20 may perform an online payment by providing the virtual card number generated based on empty card data to the server 30 through a PG server. Alternatively, the user terminal 20 may provide the virtual card number generated based on the empty card data, to the POS device, and the POS device may provide the virtual card number to the server 30 via an acquirer server, thereby performing an offline payment using the virtual card number.

Furthermore, in another embodiment, the empty card device 100 may include a control unit (not illustrated) and a display unit (not illustrated).

In an embodiment, when the empty card device further including the control unit and the display unit performs an offline payment, the empty card device may include a virtual card number generating function to generate a virtual card number and may provide the virtual card number to the outside through various output means. For example, the empty card device 100 according to an embodiment of the inventive concept may transmit and output the virtual card number generated at the request of the user, to an IC chip, a magnetic field generating unit, or an NFC module. Furthermore, the empty card device 100 may output a QR code generated based on the virtual card number to the display unit to make an offline payment.

In another embodiment, when making the online payment, the empty card device 100 generates the virtual card number by the control unit using the empty card data stored in the IC chip 110 and displays the generated virtual card number on the display unit. As such, the user may make an online payment by identifying the virtual card number to provide the virtual card number to the PG server. That is, the user may make a payment with only the empty card by using the virtual card number, without the dedicated program 21 embedded or installed in a user terminal, thereby performing a financial transaction with both security and convenience.

At this time, the display unit may include at least one of a liquid crystal display, a thin film transistor-liquid crystal display, an organic light-emitting diode, a flexible display, and an E-paper.

In an embodiment, when the empty card device 100 may not generate the virtual card number via the control unit because the battery embedded in the empty card device 100 is discharged, the empty card device 100 may perform a financial transaction in the manner of an empty card instead of an electronic device, using the empty card data stored in the IC chip 110. For example, in the case where the empty card device 100 makes an offline payment when the battery of the empty card device 100 is discharged, the empty card device 100 directly transmits the empty card number stored in the IC chip to the POS device, and a finance company server or a token server may search for the real card number through the empty card number. In the case where the empty card device 100 performs an offline or online payment by using the virtual card number when the battery of the empty card device 100 is discharged, the empty card device 100 transmits the empty card data to the dedicated program 21 through wireless communication, and the dedicated program 21 may generate and output the virtual card number to the outside, using the empty card data. That is, when the user desires to perform an online payment, the user terminal in which the dedicated program 21 is installed outputs the virtual card number to the display unit; when the user desires to perform an offline payment, the user terminal outputs a QR code to the display unit or transmits the virtual card number to an IC chip, a magnetic field generating unit, an NFC module, or the like.

Figure 4:
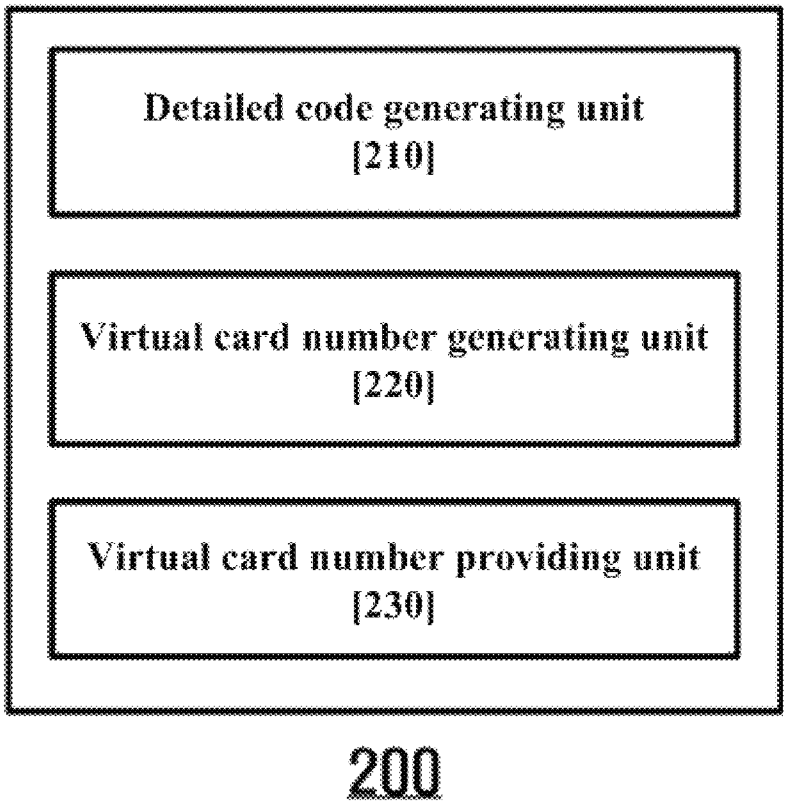
FIG. 4 is a block diagram of a virtual card number generating device, according to an embodiment of the inventive concept.

FIG. 4 is a block diagram of a virtual card number generating device, according to an embodiment of the inventive concept.

As illustrated in FIG. 4, the virtual card number generating device 200 includes a detailed code generating unit 210, a virtual card number generating unit 220, and a virtual card number providing unit 230.

In an embodiment, the virtual card number generating device 200 may be the user terminal 20 in which a program (i.e., an application) for generating a virtual card number for the financial transaction is installed.

The detailed code generating unit 210 generates one or more detailed codes, using the empty card data provided through wireless communication by the empty card device 100.

The virtual card number generating function includes one or more detailed code generating functions. For example, in the case where the virtual card number includes a plurality of detailed codes, the virtual card number generating function generates a plurality of detailed codes, using a plurality of detailed codes generating functions and generates a virtual card number, using a detailed code combining function to combine the plurality of detailed codes.

In an embodiment, the virtual card number generating device 200 may use the empty card serial number provided from an empty card, as one of the seed data of the virtual card number generating function. As a specific example, the detailed code generating unit 210 generates each detailed code through one detailed code generating function, using a combination serial number obtained by combining the empty card serial number provided by the empty card device 100 and the serial number of the empty card-dedicated program 21 installed in the virtual card number generating device 200 (i.e., the user terminal 20) as the seed data of each detailed code generating function. At this time, the detailed code generating unit 210 may generate each detailed code, using a time point or a count value at which the user payment is requested.

In an embodiment, the detailed code generating unit 210 includes a first function and a second function as detailed code generating functions to generate a first code and a second code. At this time, the virtual card number generating device 200 may only include the first function generating the first code and the second function generating the second code as the detailed code generating functions to improve security, and the data about the correlation between the first code and the second code may not be included.

The virtual card number generating unit 220 combines one or more detailed codes, using the virtual card number generating function to generate the virtual card number. In an embodiment, the virtual card number may be generated by combining a plurality of detailed codes depending on a specific rule. The virtual card number generating function includes the rule (i.e., the detailed code combining function) to combine a plurality of detailed codes. That is, the virtual card number generating unit 220 may combine one or more detailed codes, using the detailed code combining function included in the virtual card number generating function.

Various methods may be applied to the method of generating one virtual card number by combining the plurality of detailed codes. As the example of the detailed code combining function, the virtual card number generating unit 220 may generate the virtual card number in the manner of alternately positioning the first code of N-digits and the second code of N-digits. Furthermore, for another example, the detailed code combining function may be a function that combines the second code behind the first code. As the detailed code included in the virtual card number increases, the detailed code combining function may be generated variously.

Furthermore, in an embodiment, when the virtual card number is generated through the combination according to the specific rule of the first code and the second code, the first code and the second code may be matched to an empty card and each of the first code and the second code may search for an empty card storage location at which the real card number is stored. For example, the first code sets the start point of the storage location search, and the second code sets the search path from the start point to the empty card storage location depending on a specific search method. That is, when the virtual card number generated normally for each unit count is provided by the virtual card number generating device 200, a virtual card number verifying device 300 determines that a point moving along the search path corresponding to the second code from the search start point corresponding to the first code is a point (an empty card storage location) connected to a real card number storage area. The detailed method of searching for the empty card storage location based on the first code and the second code constituting the virtual card number will be described later.

As an embodiment of a method in which the detailed code generating unit 210 generates the detailed code, the detailed code generating unit 210 generates a new detailed code for each unit count, and thus the virtual card number generating device 200 generates a new virtual card number for each unit count. The virtual card number newly generated for each unit count is not generated redundantly. In particular, the detailed code generating unit 210 may be configured such that the virtual card number newly generated for each unit count is not redundantly generated between users belonging to a specific group as well as not being generated during a specified duration for a specific user or the specific virtual card number generating device 200.

As the detailed embodiment of preventing the virtual card number from being generated redundantly, when generating the first code or the second code of N digits by using M characters, the detailed code generating function included in the virtual card number generating function may generate $M^N$ codes as the first code or the second code and may match each code for each count from the initial time point at which the detailed code generating function is operated. For example, when setting the unit count to one second, the detailed code generating function matches different $M^N$ codes every second from the first time driven point. Moreover, when the period of using the specific detailed code generating function or the usage period (e.g., the expiration date of the user terminal where the application generating the virtual card number is installed) of the virtual card number generating device 200 is set to be shorter than the time length (e.g., $M^N$ seconds in the case where 1 count is 1 second) corresponding to $M^N$ count, the first code or the second code is not generated redundantly to be the same as each other during the usage period. That is, when the count increases with time, in the case where a user requests the virtual card number generating device 200 to generate a virtual card number by contacting an empty card at a specific time point, the virtual card number generating device 200 may generate a code value matched to a count corresponding to a specific time point, as the first code or the second code.

In particular, when alphabetic uppercase characters and numbers from 0 to 9 are used as characters capable of being included in a code (i.e., using 36 characters) and 6 digits are respectively assigned to first and second codes, the virtual card number generating device 200 may provide 366 codes as the first code and the second code. At this time, the virtual card number generating device 200 may provide the first code and the second code, which are changed for each count, by matching each code for each count.

As the detailed embodiment of preventing the virtual card number from being generated redundantly, when the usage period of the virtual card number generating device 200 elapses, the virtual card number, the usage period of which is different from the previous usage period may be generated by changing the function (i.e., the first function or the second function) to generate the first code or the second code or by changing the matching relationship between the first code and the second code. In the case where the first code generated by the first function and the second code generated by the second function are combined in the virtual card number, when the first code generating function or the second code generating function are changed, the virtual card number generating device 200 may apply the virtual card number generating function to generate the virtual card number to a new usage period different from the previous period as the order in which the first code or the second code appears differs from the order in the previous usage period. Furthermore, the virtual card number generating device 200 may select the first function and the second function such that a code the same as the virtual card number used in the previous usage period does not appear as the virtual card number of each count in a new usage period (i.e., such that the matching relationship between the first code generated depending on the first function and the second code generated depending on the second function is not included in the matching relationship included in the previous usage period, at all counts in the new usage period). That is, after the usage period capable of applying $M^N$ codes once elapses, the virtual card number generating function in a new usage period, which overlaps with the previous usage period and in which the virtual card number is not generated may be applied through adjusting or updating the virtual card number generating function.

Furthermore, as the detailed other embodiment of preventing the virtual card number from being generated redundantly, one of the first code or the second code included in the virtual card number may be generated by reflecting a value (i.e., a device identification value), which is always differently present for each virtual card number generating device 200 at the same time point, such that the same virtual card number is not generated between users (i.e., users employing the empty card of the same type) belonging to the same group at the same time point. In an embodiment, the device identification value may be the elapsed time (or the number of counts) from the time point (e.g., the time point at which a specific empty card is registered in the specific virtual card number generating device 200 and the detailed code generating function starts to be applied, after a specific time elapses from the first time point at which the specific detailed code generating function is driven in the server 30), at which the specific virtual card number generating device 200 is included in a group to which the specific detailed code generating function is applied, to the present. In the case where empty cards of the same type are determined as one group, there are a plurality of users employing empty cards of the same type, and an empty card employed by each user is registered in each user terminal, when the count that allows the empty card registered in the virtual card number generating device 200 to belong to the corresponding group is not the same (i.e., the empty card registered in the virtual card number generating device 200 does not belong to the same group at the same time), the time elapsed from the time point (or count), at which the empty card registered in the virtual card number generating device 200 belongs to the group, to the specific time point is different for each of the empty cards 10. Accordingly, at least one of the detailed code generating functions may allow the virtual card numbers generated by each of the virtual card number generating devices 200 to be different for each time point, using the time elapsed from the time point (or count), at which the virtual card number generating device 200 belongs to the group, to a specific time point as a device identification value. As such, the virtual card number verifying device 300 may distinguish the virtual card number generating device 200 only by receiving the virtual card number without separately receiving the data for distinguishing the user.

Furthermore, in another embodiment, when there are a plurality of token service operators or an empty card-based financial transaction service is provided for each card issuer, each service server (i.e., each token service server or each finance company server) may use each storage location search algorithm. At this time, a plurality of users respectively employing services employ the empty card of each of the users and register the empty card in a server at the specific time point. When the user registers a specific empty card through the empty card-dedicated program 21 for the specific service, which is installed in the user terminal 20, the corresponding service server may allow an storage location search algorithm to set the count (e.g., the count at the time point at which a user terminal transmits the empty card data to a server or the count at the time point at which the user terminal receives the empty card data from the empty card), at which the registration of the empty card is requested, as the point for connecting to the real card number storage space corresponding to the empty card. For example, when the registration of the empty card 10 employed by the first user is requested through the user terminal 20 of the first user at a time point elapsed by time 'A' from a point in time when the storage location search algorithm for an empty card-based financial transaction service employed by the first user is first operated and when the second user makes a request for the registration of the empty card 10 employed by the second user, through the user terminal 20 of the second user at a time point elapsed by time 'B' from a point in time when the storage location search algorithm for an empty card-based financial transaction service the same as the first user is first operated, even though each of the first user and the second user make a payment request at time 'C' (value 'C' is greater than value 'B'), using the empty card 10, the length of time from the registration time points 'A' and 'B' of each empty card to the payment request time point 'C' is always different. Accordingly, the detailed code generating function applies the time length elapsed from a point in time when each of the empty cards 10 is registered, as a variable, thereby preventing the same virtual card number from being generated at the same time point.

Accordingly, because the time length elapsed from the time point at which the empty card 10 employed by a specific user is registered in the virtual card number generating device 200 (i.e., the user terminal 20) continuously increases with time, the detailed code (e.g., the second code) generated by the specific virtual card number generating device 200 is not generated as the same value but is continuously generated as a different value.

Furthermore, as the detailed other embodiment of preventing the virtual card number from being generated redundantly, such that a redundant virtual card number is not generated in the whole period regardless of the user, the first code may be set as a code value corresponding to a time point (or count) at which the generation of a virtual card number is requested, among codes matched for each count from an initial time point at which the first function is driven; the second code may be set as a code value generated by reflecting a value (i.e., a device identification value) that always differently exists at the same time point for each of the empty cards 10; the virtual card number may be used as a code value obtained by combining the first code and the second code. Because the first code has a different code value for each count and the second code has a different code value for each of the empty cards 10 at the same time point, the virtual card number obtained by combining the first code and the second code may be output as a different code value for all of the empty cards 10 at every time point.

Furthermore, as the detailed other embodiment of preventing the virtual card number from being generated redundantly, the virtual card number generating function shifts the reference count for determining the first code and the second code, at the count corresponding to an arbitrary time point, not a financial transaction request time point, and generates the first code and the second code based on the reference count determined at the financial transaction request time point. As a specific example, the virtual card number generating device 200 sets the point moved from the empty card registration time point (i.e., a point at which a real card number storage space matched to an empty card is connected) or the financial transaction request time point by the code value generated by the specific OTP function, to the reference count and generates the first code and the second code based on the set reference count.

Furthermore, in another embodiment, one of a plurality of listing rules that lists M characters in ascending order may be applied to the virtual card number generating function (or the detailed code generating function). That is, the virtual card number generating device 200 may variously apply rules for listing M characters in ascending order, to the detailed code generating function included in the virtual card number generating function. For example, the listing rule for listing uppercase alphabetic characters in ascending order may be the order of A, B, C, . . . , and Z that is the general order or may be the order of A, C, B, . . . , and Z. As the listing rule is changed in the virtual card number generating function, the order in which the codes are matched sequentially for each count from the initial time point at which the virtual card number generating function is operated is different.

The virtual card number providing unit 230 provides the generated virtual card number to the outside.

In an embodiment, the virtual card number providing unit 230 may output the virtual card number to the outside. For example, when the user desires to make an online payment based on the virtual card number, the virtual card number providing unit 230 allows the user to visually identify or copy the virtual card number and then outputs the virtual card number on a screen so as to be pasted onto another program or web page.

Furthermore, for example, when the user desires to perform an offline payment by using the user terminal 20, the virtual card number providing unit 230 outputs the virtual card number of the count, at which the financial transaction is requested through the means (e.g., an NFC module, a display module capable of displaying QR code, a Magnetic Secure Transmission (MST) module, or the like) for transmitting the virtual card number in the user terminal to the POS device.

Furthermore, in another embodiment, when an empty card is initially registered in a service server (e.g., a token service server or a finance company server), the virtual card number providing unit 230 transmits all or part of the empty card data to the service server, using the communication module of the user terminal 20. For example, as described later, for the purpose of directly performing an offline payment using an empty card, the virtual card number providing unit 230 transmits an empty card number to the service server at a specific time point, allows the empty card number to be connected to the real card number storage space, and is configured such that the real card number storage space is connected from the count value (i.e., a count value at which the empty card is registered) corresponding to the specific time point.

Furthermore, in another embodiment, when changing the basic card linked to the empty card in the service server, the virtual card number providing unit 230 transmits the virtual card number generated at the corresponding time point and basic card change request data, to the service server by using the communication module of the user terminal 20. For example, when a user may make a request for changing the basic card from card 'A' to card 'B' in the empty card-dedicated program 21, the virtual card number providing unit 230 transmits the virtual card number corresponding to a change request time point and basic card change request data including identification information of card 'B', to the service server through wireless communication.

Figure 5:
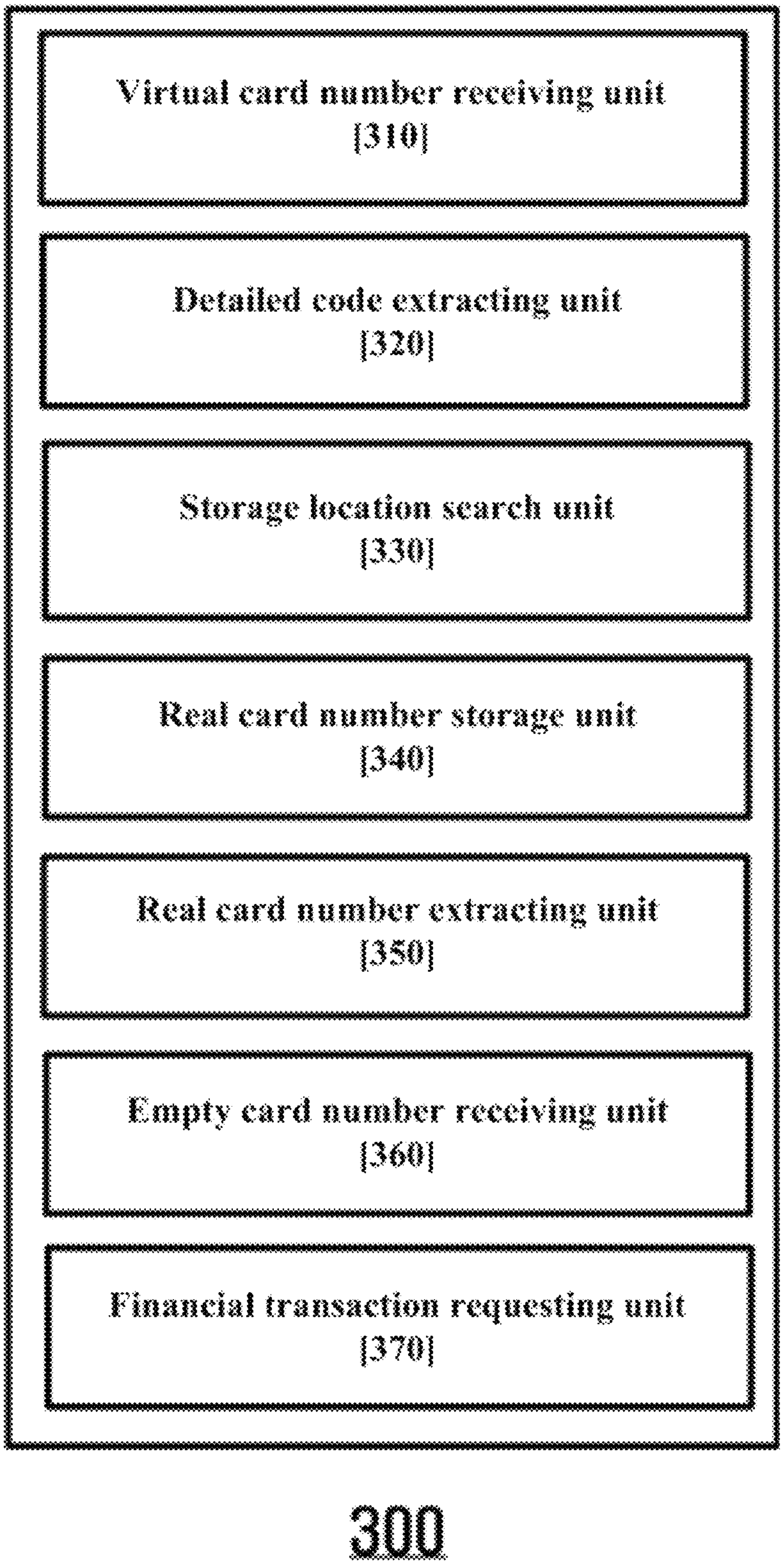
FIG. 5 is a block diagram of a virtual card number verifying device, according to an embodiment of the inventive concept.

FIG. 5 is a block diagram of a virtual card number verifying device, according to an embodiment of the inventive concept.

As illustrated in FIG. 5, the virtual card number verifying device 300 includes a virtual card number receiving unit 310, a detailed code extracting unit 320, a storage location search unit 330, a real card number storage unit 340, and a real card number extracting unit 350.

Herein, the virtual card number verifying device 300 refers to a server that extracts a real card number linked to an empty card based on a virtual card number or the empty card number and makes a payment with the real card number or a server (e.g., a server that makes a request for payment progress by providing the extracted real card number to a PG server or an acquirer server) that makes a request for a financial transaction progress with a real card number.

The virtual card number receiving unit 310 receives the virtual card number provided from the virtual card number providing unit 230. That is, as illustrated in FIG. 2, the virtual card number receiving unit 310 receives the virtual card number generated by the virtual card number generating device 200, via an external server (e.g., the acquirer server connected to a POS device in the case of an offline payment, or a PG server in the case of an online payment). As the virtual card number is generated in the same form as the real card number, the virtual card number receiving unit 310 may receive the virtual card number in the manner the same as in a general financial transaction.

Furthermore, the virtual card number includes the fixed code corresponding to the virtual card number verifying device 300, and the external server (i.e., the PG server or the acquirer server) transmits the virtual card number to the service server. As such, the virtual card number receiving unit 310 may receive the virtual card number used for real card number search, from the external server (i.e., the PG server or the acquirer server). As a specific example, as the fixed code corresponding to the virtual card number verifying device 300 that is a specific service server is attached at the same location with a length the same as the IIN of the real card number, the external server (i.e., the PG server or the acquirer server) may determine that the corresponding virtual card number needs to be transmitted to the virtual card number verifying device 300 that is the specific service server.

The detailed code extracting unit 320 extracts one or more detailed codes included in the virtual card number. In an embodiment, the detailed code extracting unit 320 extracts only the detailed code from the virtual card number in which the fixed code is included.

Furthermore, in another embodiment, the detailed code extracting unit 320 of the virtual card number verifying device 300 includes the detailed code combining function included in the virtual card number generating function for a specific empty card type. Accordingly, when the virtual card number includes a plurality of detailed codes, the detailed code extracting unit 320 may extract a plurality of detailed codes from the virtual card number by applying the detailed code combining function. For example, when the virtual card number generating device 200 generates the virtual card number obtained by combining two detailed codes (i.e., the first code and the second code), the detailed code extracting unit 320 may separate the first code and the second code by applying the detailed code combining function to the character string array of the virtual card number.

The storage location search unit 330 searches for a storage location at which an empty card is registered in a storage location search algorithm, based on the extracted one or more detailed codes. Herein, the storage location search algorithm is matched to the virtual card number generating function used when the virtual card number generating device 200 generates the virtual card number. Various methods may be applied to the method in which the storage location search unit 330 searches for an empty card storage location based on each detailed code. There is the correlation between detailed codes such that the storage location search unit 330 may search for a storage location based on a plurality of detailed codes.

When the virtual card number is composed of the first code and the second code, as an embodiment of having the correlation between detailed codes, the storage location search unit 330 may determine a search start point corresponding to the first code and may search for the point, which is moved along the search path corresponding to the second code from the search start point, as an empty card storage location. That is, the detailed code may include the first code for setting the start point of the storage location search and the second code for setting the search path from the start point to the empty card storage location depending on the specific search method.

Furthermore, in another embodiment, as the virtual card number generating device 200 provides a new virtual card number for each unit count, the virtual card number verifying device 300 may set the search start point and the search path based on the first code and the second code changed for each count to search for empty card storage location (i.e., a location at which an empty card is registered).

Furthermore, in another embodiment, for the purpose of searching for the empty card storage location by using a plurality of detailed codes having the correlation, the storage location search unit 330 may include the storage location search algorithm. The storage location search algorithm is an algorithm that allows the storage location search to be possible when each detailed code included in the virtual card number is applied, is matched to the virtual card number generating function used when the virtual card number generating device 200 generates the virtual card number.

For example, in the case where the virtual card number includes the first code for determining the search start point of the storage location and the second code for presenting the storage location direction from the search start point, when the storage location search algorithm allows a direction to be changed to the direction corresponding to the second code at the point corresponding to the first code, the storage location search algorithm is an algorithm that adjusts the storage location at which the registration time point of the empty card is matched to be positioned at the corresponding location.

Furthermore, in an embodiment, the UID in the storage location search algorithm may be assigned to each storage location. That is, each storage location may include the UID that is a code value capable of being specifying each storage location. In particular, the UID is a code value assigned to each storage location (i.e., each count at which an empty card is capable of being registered) on the storage location search algorithm for an empty card-based financial transaction service employed by the user and is a code value indicating a count at which the empty card 10 of a specific user is registered. That is, the storage location search unit 330 may extract the empty card storage location based on the virtual card number and may extract the UID of the empty card assigned to the storage location.

As using the storage location search algorithm, even though the first code and the second code included in the virtual card number is changed, the virtual card number verifying device 300 may search for the storage location (i.e., the registration count of the empty card) of the empty card 10 or the point matched to the storage location. Various methods may be applied to the storage location search algorithm, and the detailed exemplification will be described later. However, the storage location search algorithm is not limited to the exemplification described below.

Figure 7:
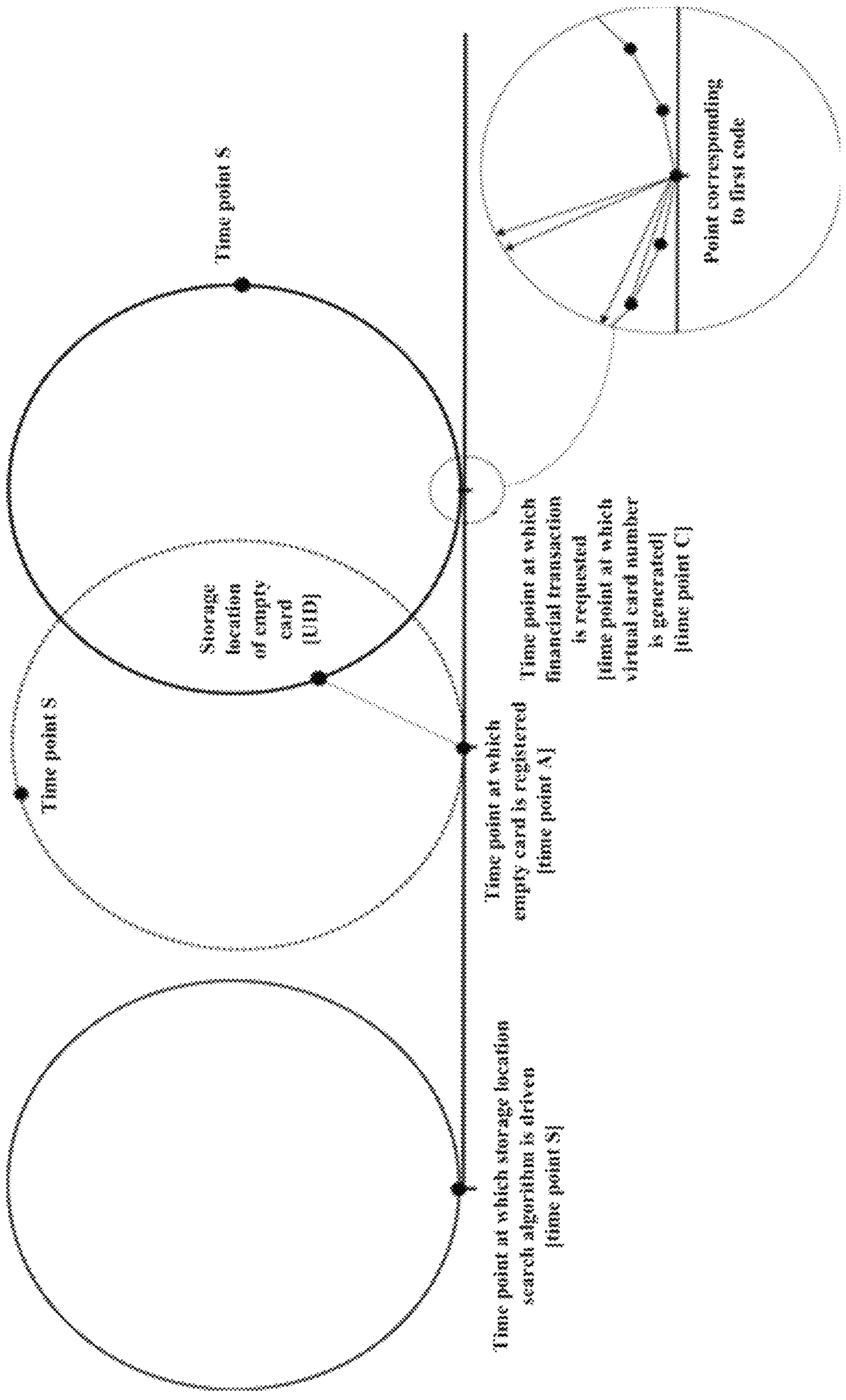
FIG. 7 is an exemplary view illustrating a storage location search algorithm searching for a storage location of an empty card through cloud movement of a k-polygon, according to an embodiment of the inventive concept.

For example, referring to FIG. 7, when the storage location search algorithm is a k-polygon ('k' is $M^N$) that performs cloud movement along a track in which $M^N$ codes corresponding to the first code is listed, and when the vertex of the k-polygon moves while corresponding to a point at which a code is positioned on a first code track, each vertex of the k-polygon is matched to an empty card storage location and the point corresponding to the first code track (e.g., the first track) and the k-polygon is a storage location search start point corresponding to the first code. At this time, the storage location search unit 330 may apply the k-polygon to the cloud movement such that the vertex of the k-polygon is in contact with the point corresponding to the first code extracted by the detailed code extracting unit 320. As such, as the storage location search unit 330 allows an angle to be changed from the location on the first track, which the k-polygon is contact with, to an angle (e.g., a specific angle obtained by dividing 180 degrees into $M^N$ pieces so as to face the vertex of the k-polygon) corresponding to a second code, the storage location search unit 330 may search for the vertex of the k-polygon that is a storage location at which the empty card corresponding to the virtual card number is stored.

In particular, as illustrated in FIG. 7, the virtual card number verifying device 300 may perform cloud movement (i.e., each vertex of the k-polygon moves while sequentially being in contact with each point on the track) to the point corresponding to the first code on the k-polygon. Afterward, the virtual card number verifying device 300 allows an angle direction to be changed to the angle direction corresponding to the second code to search for the vertex corresponding to the storage location.

After searching for the empty card storage location or the empty card registration location by using the first code and the second code in the virtual card number in the storage location search algorithm, the storage location search unit 330 extracts an UID stored therein.

Various other storage location search algorithms will be described in detail later.

Figure 14:
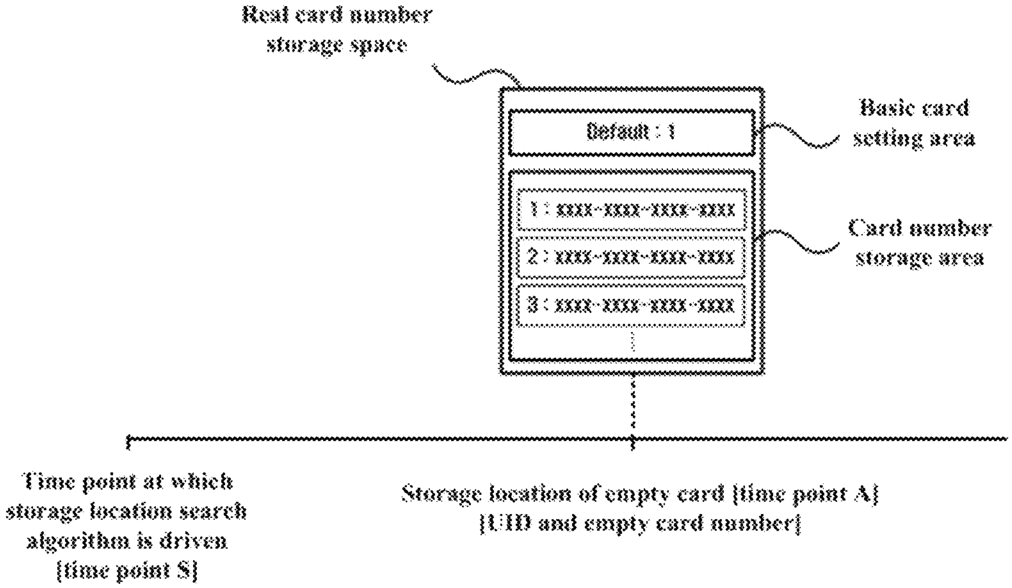
FIG. 14 is an exemplary view for describing a real card number storage space connected to UID and empty card number, according to an embodiment of the inventive concept.

The real card number storage unit 340 may generate a real card number storage space for each user or for each empty card to store a real card number. In an embodiment, the real card number storage unit 340 includes the real card number storage space in which one or more real card numbers are stored. Furthermore, when a plurality of real card numbers are stored, as illustrated in FIG. 14, the real card number storage unit 340 includes a card number storage area in which a plurality of real card numbers receives (e.g., receives the identification number depending on the order in which the real card number is registered) an identification number and then is stored, and a basic card setting area in which the identification number of the real card number set as a basic card (or a default card) is stored.

Furthermore, in another embodiment, when the real card number storage unit 340 utilizes a virtual security code (e.g., OTP code) upon generating the virtual card number, the real card number storage unit 340 may further include a seed data storage area for storing seed data used to generate the virtual security code. For example, when the combination serial number obtained by combining an application serial number and an empty card serial number to generate the OTP code being the virtual security code, the seed data storage area may store the combination serial number.

The real card number storage space matched to the specific empty card of the real card number storage unit 340 may be connected to the UID assigned to the empty card storage location found by the storage location search unit 330.

The real card number extracting unit 350 extracts the real card number stored in the found real card number storage space.

When each of the empty cards 10 is registered, the real card number storage space is allocated, and one or more real card numbers are stored in the real card number storage space. Accordingly, when a user makes a payment request by using the empty card 10, the real card number extracting unit 350 extracts the UID assigned to the empty card storage location found based on the virtual card number and searches for the real card number storage space of the empty card connected to the UID. Afterward, the real card number extracting unit 350 may extract the real card number stored in the found real card number storage space.

According to an embodiment, as illustrated in FIG. 14, the real card number storage space may separately have an area (i.e., a basic card setting area) for storing the basic card (i.e., default card) information and an area (i.e., a card number storage area) for storing each real card number; when the payment request is received from the user terminal 20, the real card number extracting unit 350 may identify the identification information of the basic card in the basic card setting area and may extract the real card number corresponding to the basic card in the card number storage area.

Furthermore, in another embodiment, the virtual card number verifying device 300 may further include an empty card number receiving unit 360. The empty card number receiving unit 360 may be formed separately from the virtual card number receiving unit 310 or may be integrated with the virtual card number receiving unit 310 as one unit.

For example, when the empty card number receiving unit 360 and the virtual card number receiving unit 310 are integrated with one unit, the virtual card number receiving unit 310 performs the following procedure matched to the number type after receiving the empty card number and the virtual card number from the acquirer server and the PG server. That is, when receiving a virtual card number, the virtual card number receiving unit 310 transmits the virtual card number to the detailed code extracting unit 320; when receiving the empty card number, the virtual card number receiving unit 310 transmits the empty card number to the real card number extracting unit 350 at once to extract the real card number in the real card number storage space connected to the corresponding empty card number in the real card number storage unit 340.

Furthermore, in an embodiment, the virtual card number receiving unit 310 may distinguish the empty card number from the virtual card number based on the path in which the empty card number and the virtual card number are obtained. For example, when it is impossible to make an offline payment using the virtual card number, the virtual card number receiving unit 310 may determine the code received through the offline payment process, as the empty card number and may determine the code received through the online payment process, as the virtual card number.

Furthermore, for example, the virtual card number receiving unit 310 may distinguish the empty card number from the virtual card number through different fixed codes. When it is possible to make an offline payment using the virtual card number generated by the user terminal, the virtual card number receiving unit 310 may not distinguish the empty card number from the virtual card number through only the process in which a code is entered. Accordingly, the empty card number and the virtual card number may be configured to include different fixed codes from each other, the virtual card number receiving unit 310 extracts the fixed code in the received code and then may perform the following procedure after determining whether the fixed code is a fixed code associated with the virtual card number or whether the fixed code is a fixed code associated with the empty card number.

The real card number storage space matched to the specific empty card of the real card number storage unit 340 is connected to not only the UID of the point at which an empty card is stored in the storage location search algorithm but also the empty card number of the empty card. As such, the empty card number receiving unit 360 receives the empty card number from an external server (e.g., the acquirer server receives the empty card number from a POS device).

At this time, the real card number extracting unit 350 searches for the real card number storage space matched to the corresponding empty card in the real card number storage unit 340, using the empty card number received by the empty card number receiving unit 360.

Furthermore, in another embodiment, when the empty card number is received through an online payment process, the empty card number receiving unit 360 may interrupt the payment progress. Because the payment using the empty card number is possible upon making an offline payment through the POS device, the empty card number receiving unit 360 may determine abnormal financial transaction request and may not perform real card number search when the corresponding empty card number is used in the online payment and is received through the PG server or the like.

Furthermore, according to an embodiment of the inventive concept, the virtual card number verifying device 300 includes a financial transaction requesting unit 370. For example, when the finance company directly making a payment operates the virtual card number verifying device 300, the virtual card number verifying device 300 may directly proceed with a payment procedure or may transmit the real card number and payment information to a separate payment server making a payment. Furthermore, for example, when a token service provider operates the virtual card number verifying device 300, the virtual card number verifying device 300 may transmit the extracted real card number to an external server (e.g., the PG server or the acquirer server) again or may directly transmit the real card number and the payment information to the finance company corresponding to the corresponding real card number.

Figure 6:
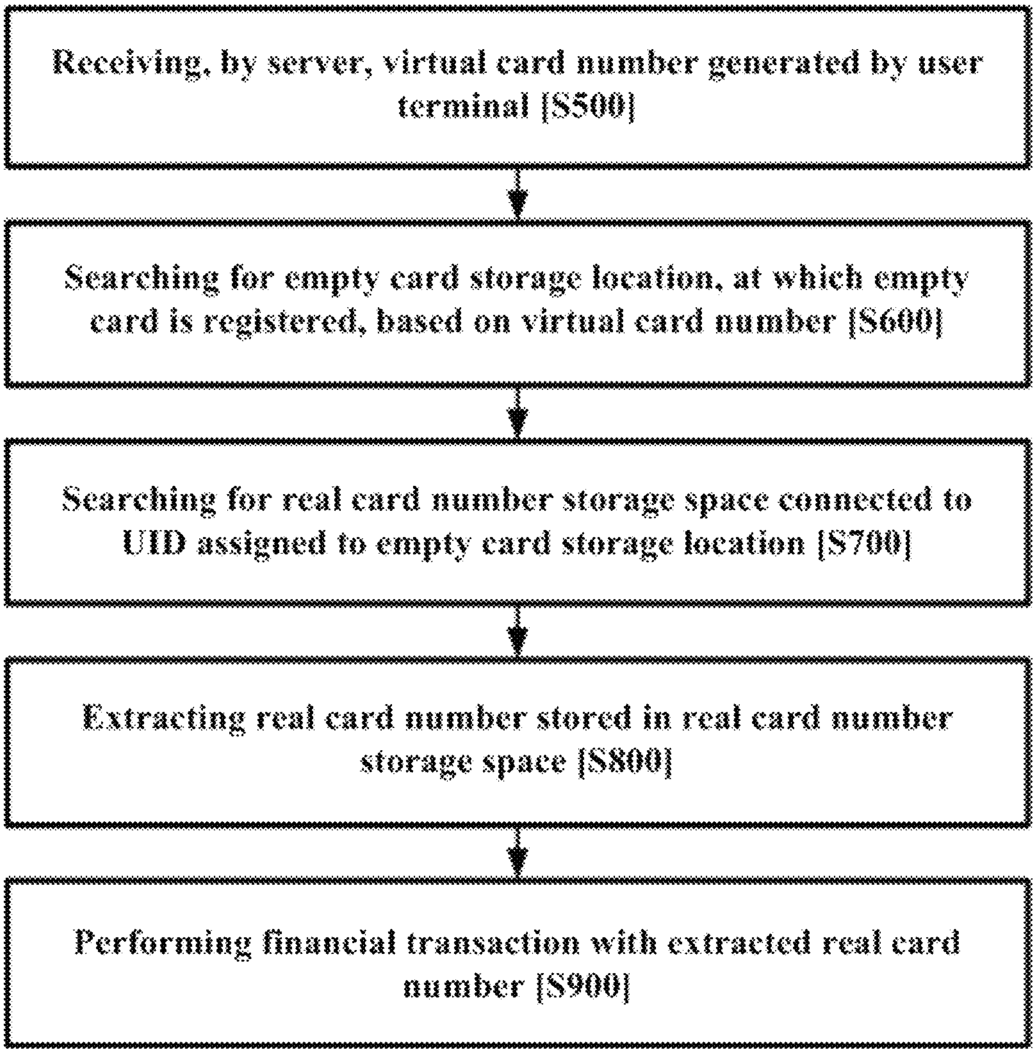
FIG. 6 is a flowchart of a financial transaction providing method using an empty card, according to an embodiment of the inventive concept.

FIG. 6 is a flowchart of a financial transaction providing method using an empty card, according to an embodiment of the inventive concept.

Referring to FIG. 6, according to an embodiment of the inventive concept, the financial transaction providing method using an empty card includes an operation S500, by the server 30, (an operation of receiving a virtual card number) of receiving a virtual card number generated by the user terminal 20 (or an empty card-dedicated program), an operation S600 (an operation of searching for a storage location) of searching for an empty card storage location (i.e., empty card registration location) at which the empty card 10 is registered, based on a virtual card number, an operation S700 (an operation of searching for a real card number storage space) of searching for a real card number storage space connected to the UID assigned to an empty card storage location, an operation S800 (an operation of extracting a real card number) of extracting a real card number stored in the real card number storage space, and an operation S900 (an operation of performing a financial transaction) of performing a financial transaction with the extracted real card number. Hereinafter, the detailed description of each operation is provided. However, the detailed description of the contents described in the description process associated with the virtual card number generating device 200 (i.e., the user terminal 20) and the virtual card number verifying device 300 (i.e., the server 30) is omitted.

In operation S500, the server 30 receives a virtual card number generated by a program (i.e., an application) included in the user terminal 20. Herein, the virtual card number is generated by a virtual card number generating function in an empty card-dedicated program, based on empty card data provided from the empty card 10 of a user through wireless communication; the empty card data is specific data assigned when the empty card 10 is manufactured, and includes an empty card number, a serial number, or the like of the empty card.

According to an embodiment, the virtual card number may be generated based on time data in which the user terminal 20 receives empty card data from the empty card 10 or time data in which a payment is requested by the user terminal 20.

According to another embodiment, the virtual card number may be generated based on the combination serial number obtained by combining the empty card serial number included in the empty card data and a program serial number (i.e., an application serial number) included in the empty card-dedicated program 21.

The user terminal 20 may generate the virtual card number based on the time data and the combination serial number, using the virtual card number generating function included in the empty card-dedicated program 21. That is, the virtual card number may be generated by combining the time data and the combination serial number depending on a specific rule, and the generated virtual card number may be provided to the server 30.

In an embodiment, the user terminal 20 may generate each detailed code through the empty card-dedicated program 21, using an empty card serial number, a program serial number (i.e., an application serial number), and the combination serial number obtained by combining the empty card serial number and the program serial number as seed data of each detailed code generating function.

Furthermore, in an embodiment, the user terminal 20 may generate each detailed code through the empty card-dedicated program 21, using time data in which the user terminal 20 receives empty card data from the empty card 10 or time data in which the user terminal 20 makes a request for a payment, as seed data of each detailed code generating function.

When generating a plurality of detailed codes using each detailed code generating function, the user terminal 20 may generate the virtual card number in which a plurality of detailed codes are combined, using the detailed code combining function included in the virtual card number generating function. For example, the user terminal 20 may generate the virtual card number through the empty card-dedicated program 21, using the combination serial number generated as each detailed code and the time data requested to be paid (or time data in which the empty card data is received) as the seed data of each detailed code combining function.

In addition, the virtual card number may be generated in various manners. That is, the virtual card number may be generated by various virtual card number generating functions. The detailed description of generating the virtual card number in various manners will be duplicated with the description given with reference to FIG. 4, and thus the detailed disclosure is omitted.

Afterward, in operation S600, the server 30 searches for the empty card storage location at which the empty card 10 is registered in the storage location search algorithm, based on the virtual card number. Herein, the storage location search algorithm may be matched to the virtual card number generating function included in the empty card-dedicated program 21 installed in the user terminal 20, and may search for the empty card storage location based on at least one detailed code in the virtual card number.

When the registration request of the empty card 10 is received through the user terminal 20, the server 30 stores an empty card at a specific point (count) corresponding to the registration time point of the empty card in the storage location search algorithm for the type of the corresponding empty card and connects the UID assigned to the corresponding point, to the empty card. Because the server 30 includes different storage location search algorithms for each type of the empty card, the server 30 determines the type of empty card requested to be registered and stores the empty card in the proper storage location search algorithm. Moreover, the UID is assigned to the empty card storage location in the storage location search algorithm.

According to an embodiment, when the virtual card number is generated by combining the first code and the second code, the server 30 searches for the empty card storage location in the storage location search algorithm, using the first code and the second code. For example, the first code may be a code for setting the start point of the storage location search of the empty card in the storage location search algorithm; the second code may be a code for setting the search path from the start point to the empty card storage location in the specific search manner.

As illustrated in FIG. 7, the server 30 sets the location corresponding to the first code to the start point and searches for the point (i.e., the specific vertex of a k-polygon) matched to the empty card storage location or empty card storage location in the placement state of the k-polygon, based on the second code in the search manner applied to the second code. The storage location is matched to each vertex of the k-polygon. A first code track (i.e., a first track) and a point corresponding to the k-polygon is a storage location search start point corresponding to the first code. The server 30 searches for the matching point of the empty card storage location, at the search start point based on the second code.

Various methods may be applied to the method of searching for a storage location in the k-polygon based on the second code. For example, as the server 30 allows an angle to be changed from the location on the first track, which the k-polygon is contact with, to an angle (e.g., a specific angle obtained by dividing 180 degrees into $M^N$ pieces so as to face the vertex of the k-polygon) corresponding to a second code, server 30 may search for the vertex of the k-polygon that is a storage location at which the empty card is stored, based on the virtual card number.

Furthermore, for another example, in a state where the k-polygon is in contact with the point corresponding to the first code on the first track, the server 30 divides the whole central angle (i.e., 360 degrees) into $M^N$ pieces based on the center of the k-polygon and the contact point on the first track, and matches each angle to $M^N$ second codes. At this time, the direction of the line moving by unit angles (i.e., 360 degrees/$M^N$) of specific numbers from the line connecting the center of the k-polygon to the contact point on the first track faces the specific vertex of the k-polygon. Accordingly, when the second code corresponding to the specific angle is received, the server 30 may search for the vertex positioned in the corresponding angle direction.

Furthermore, for another example, the specific digit of the second code may be used to determine an angle calculation direction. That is, when the second code is generated using 'N' ('N' is a natural number) characters, the angle measurement direction may be determined with one digit. For example, when the server 30 divides the whole central angle (i.e., 360 degrees) into $M^N$ pieces based on the center of the k-polygon and the contact point on the first track and matches the second code to each angle, the server 30 may determine whether the angle is an angle measured to the right or to the left from the line connecting the center of the k-polygon to the contact point on the first track, using the value of one digit.

For example, the storage location search algorithm may assign two second codes different from each other depending on the angle measurement direction at each vertex on the k-polygon, to one vertex. That is, the second codes different from each other in the arrival with the interior angle and the arrival with the exterior angle may be matched to the one vertex and may be connected to the storage location of another empty card. For another example, when the second code is generated using 'N' ('N' is a natural number) characters, the storage location search algorithm matches (N−1) characters to half of the total angle (e.g., 360 degrees in the case where the total angle is divided based on the center angle) and may determine the angle application direction for reaching each vertex, using one digit.

The method of searching for a storage location in the k-polygon based on the second code is not limited thereto; various methods such as the method of searching for a point for dividing space between the point on the k-polygon corresponding to the second code and the contact point on the first track at a specific ratio, as the storage location may be applied.

According to another embodiment, when the virtual card number includes the first code and the second code that are changed for each unit count, the first code is generated based on an unit count elapsed from the first time point at which the server 30 starts to issue an empty card, and the second code is generated based on an unit count elapsed from a time point at which each user registers the empty card through the empty card-dedicated program 21 installed in the user terminal 20. At this time, the unit count is set to a specific time interval and is changed as a time interval elapses.

Figure 8:
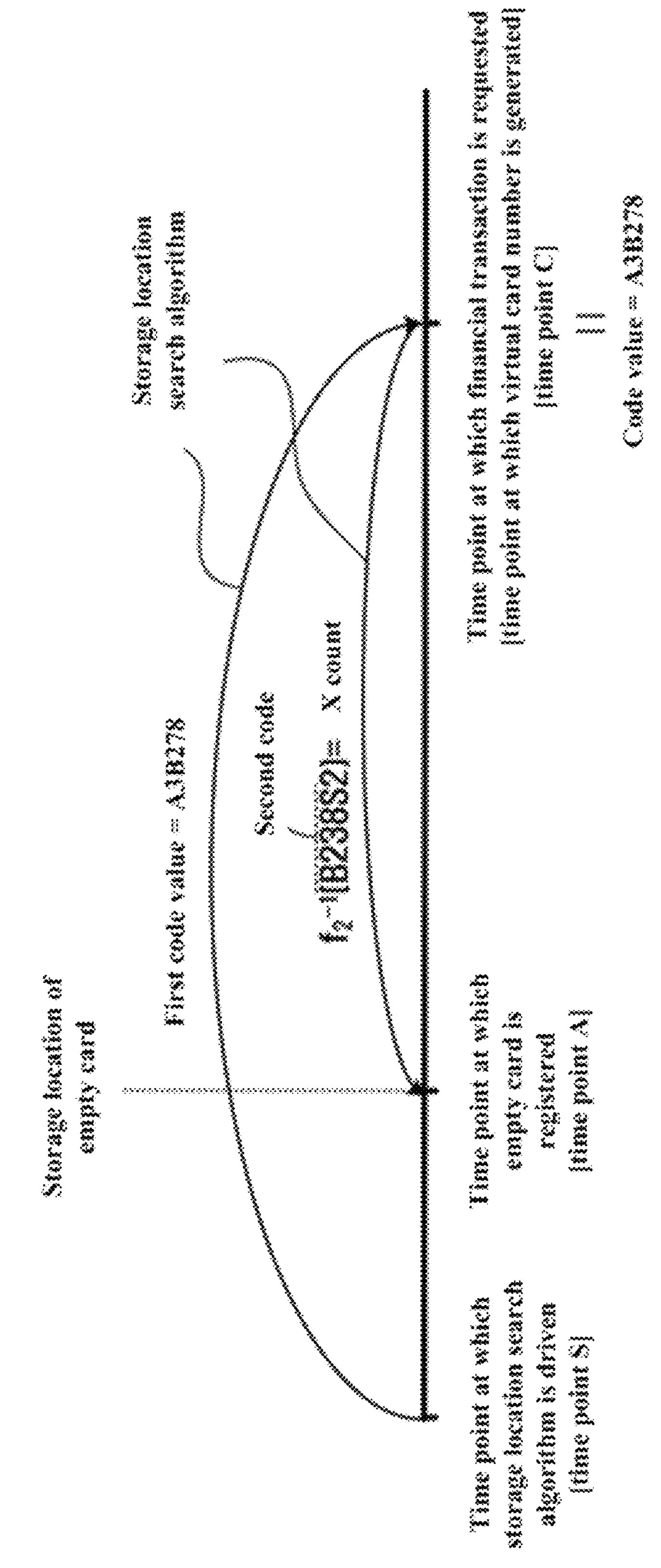
FIG. 8 is an exemplary view illustrating a storage location search algorithm searching for a storage location of an empty card while moving on a track based on a detailed code, according to an embodiment of the inventive concept.

As illustrated in FIG. 8, the storage location search algorithm is to move a location to the point matched to an empty card storage location while moving on a track based on a plurality of detailed codes constituting the virtual card number.

In particular, as the card issuer operates an empty card-based service, when the virtual card number includes the first code generated based on the unit count elapsed from the first time point at which the storage location search algorithm is started, and the second code generated based on the unit count elapsed from a time point at which each user registers the empty card 10 through the empty card-dedicated program 21 installed in the user terminal 20, as illustrated in FIG. 8, the server 30 sets the count on a track to which the code value corresponding to the first code is matched, to the search start point and returns along the track from the search start point by the count value corresponding to the second code to search for the point (i.e., the point UID matched to the empty card storage location) on a track at the time point at which the empty card 10 is registered in the server 30. For example, the server searches for the point (or count), to which the first code in the virtual card number is assigned, on the track for the first code to set the search start point, positions the track for the second code from the search start point in the opposite direction, searches for the point (or count), to which the second code in the virtual card number is assigned, and extracts a point (or count), at which an empty card is registered, on the track for the first code. Furthermore, for example, as the server sets the search start point based on the first code in the virtual card number, returns by the count value calculated by applying the inverse function of the second function to the second code in the virtual card number, and searches for the point corresponding to an empty card registration time point.

Furthermore, in another embodiment, the first code and the second code may be a code for the reference count added by OTP code generated randomly from a time point at which the empty card is registered by the user terminal 20 or a time point at which a financial transaction is requested (e.g., a time point at which a user terminal receives empty card data from the empty card or a time point at which a user terminal generates a virtual card number by using the empty card data).

Figure 13:
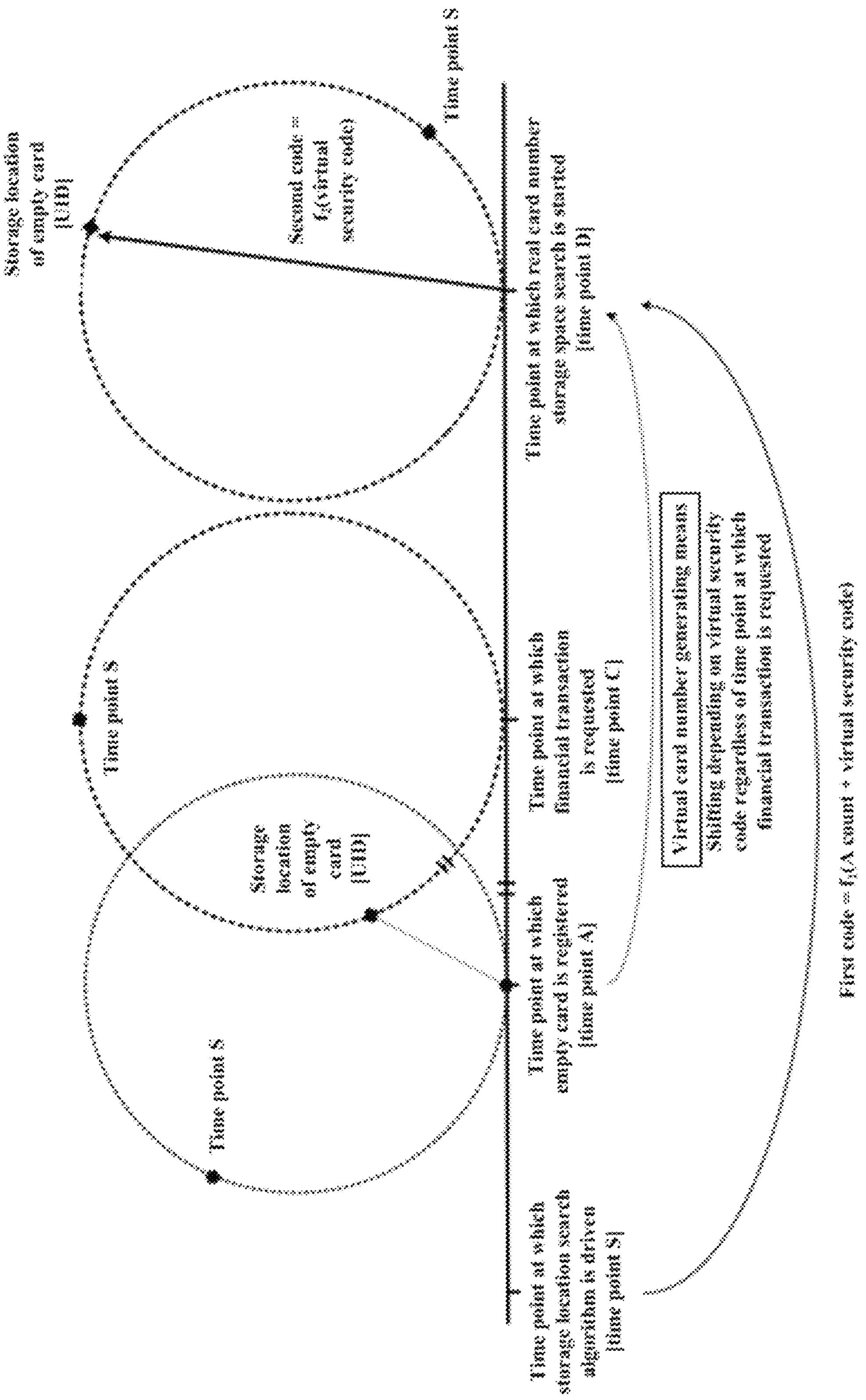
FIG. 13 is an exemplary view illustrating a method of moving a time point of real card number storage space search using a virtual security code, according to an embodiment of the inventive concept.

As the detailed embodiment, a virtual card number generating means generates the virtual security code by reflecting the virtual security code to the first code and the second code, without outputting the virtual security code to the outside. As illustrated in FIG. 13, the virtual card number generating means (e.g., an empty card-dedicated program) generates a virtual security code value (e.g., OTP code) based on a part of a serial number (i.e., a unique value) in a virtual card number generating device (i.e., a smart terminal) and the serial number of the empty card or the combination of the empty card serial number and the application serial number, generates the first code of a count, to which the virtual security code value is added, at an empty card registration time point, and generates the second code of the count corresponding to the virtual security code value (i.e., generates the virtual security code itself as the second code). That is, the first code and the second code is generated based on the count shifted by the virtual security code value from a time point 'A' at which the empty card 10 is registered in the server 30 by the user terminal 20. The count shifted from the time point 'A' may be a count earlier or later than the count corresponding to the present time point depending on the generated virtual security code value. The server being the virtual card number verifying means may apply the received first code and the received second code to the storage location search algorithm to search for the storage location (or a registration location) of the empty card. As such, it is impossible for other people to identify the order in which the first code and the second code constituting the virtual card number are provided, thereby improving the security.

Furthermore, in another embodiment, after extracting the virtual security code in the second code generated based on the virtual security code, the server being the virtual card number verifying means may determine whether there is a value the same as the virtual security code among the calculated OTP numbers, by entering the count within a specific range from the count, at which the virtual card number is received, to the virtual security code generating function (i.e., OTP function). The server being the virtual card number verifying means obtains the virtual security code value (i.e., an OTP function value) used to generate the second code by applying the inverse function of the second function to the second code and searches for the count at which a value the same as the virtual security code value is calculated. As the difference between a time point at which the virtual security code is generated in the virtual card number generating means and a time point at which the virtual card number verifying means receives the virtual security code is present due to the transmission time or delay of the virtual card number, the count at which the virtual card number verifying means receives the virtual card number may not be the same as a count at which the OTP number corresponding to the virtual security code is generated, and thus the server allows an error range from the count at which the virtual card number is received. As such, the server may prevent a financial transaction from being performed with a previously generated virtual card number instead of the currently generated virtual card number, thereby improving the security. Furthermore, even though the user does not enter the virtual security code of the specific digits when entering the virtual card number, the server itself may search for the virtual security code, thereby verifying the user terminal.

Furthermore, in another embodiment, at a time point at which a financial transaction is requested, the virtual card number generating means generates the first code corresponding to the count to which the virtual security code value generated using a part of the serial number (i.e., a unique value) in the user terminal or the empty card-dedicated program and the serial number of the empty card or the combination of both, as seed data is added, and the second code corresponding to the count obtained by adding the virtual security code value to the count difference between an empty card registration time point (time point 'A') and a financial transaction request time point (time point 'C'). That is, the formula in which the empty card-dedicated program generates the first and second codes is as follows.

$$\text{First code} = f_1(\text{count at time point } C + \text{virtual security code})$$

$$\text{Second code} = f_2(\text{count at time point } `C' - \text{count at time point } `A' + \text{virtual security code})$$

(Time point 'A': a time point at which an empty card is registered, time point 'C': a count at a time point of financial transaction request, virtual security code: OTP number)

The server 30 being the virtual card number verifying means searches for the real card number storage space based on the first code and the second code in the received virtual card number and extracts the seed data (i.e., data is used upon generating a virtual card number among the serial number of an empty card-dedicated program or a user terminal, an empty card serial number, and the combination serial number obtained by combining the serial number of an empty card-dedicated program and the empty card serial number) included in the real card number storage space together. The server generates a virtual security code (i.e., an OTP number) within a specific count range based on the seed data from a time point at which a financial transaction request is received.

Afterward, as the server searches for the point to which the real card number storage space is matched, based on the first code and the second code, the server grasps the empty card registration time point (time point 'A'). The server calculates a calculation value corresponding to the sum of the number of counts to each count within a specific count range and the virtual security code (i.e., an OTP number), based on the time point at which the financial transaction request is received, from the empty card registration time point (time point 'A') and determines whether the count the same as the number of counts (i.e., a value obtained by applying the inverse function of the second function to the second code) corresponding to the second code is present in each of the calculation values. As such, the server may determine whether the virtual card number provided by the user terminal is issued normally.

Afterward, in operation S700, the server 30 searches for the real card number storage space connected to the UID assigned to the storage location of the found empty card 10. Herein, the real card number storage space stores the real card number of the user and is linked to the UID of each empty card. That is, when the user makes a request for the storage of one or more real cards through the empty card-dedicated program 21 of the user terminal 20, the server 30 stores one or more real card numbers in the real card number storage space of the empty card.

Afterward, in operation S800, the server 30 extracts the real card number stored in the real card number storage space. The detailed description of a method in which the server 30 extracts the real card number within the real card number storage space will be described later.

Afterward, in operation S900, the server 30 proceeds with a financial transaction with the extracted real card number or makes a request for a financial transaction progress with the extracted real card number. That is, when the server 30 is a finance company server, the server 30 may complete a payment, using the extracted real card number; alternatively, when the server 30 is a token service server, the server 30 may make a request for the payment using the extracted real card number, to the finance company server.

Figure 9:
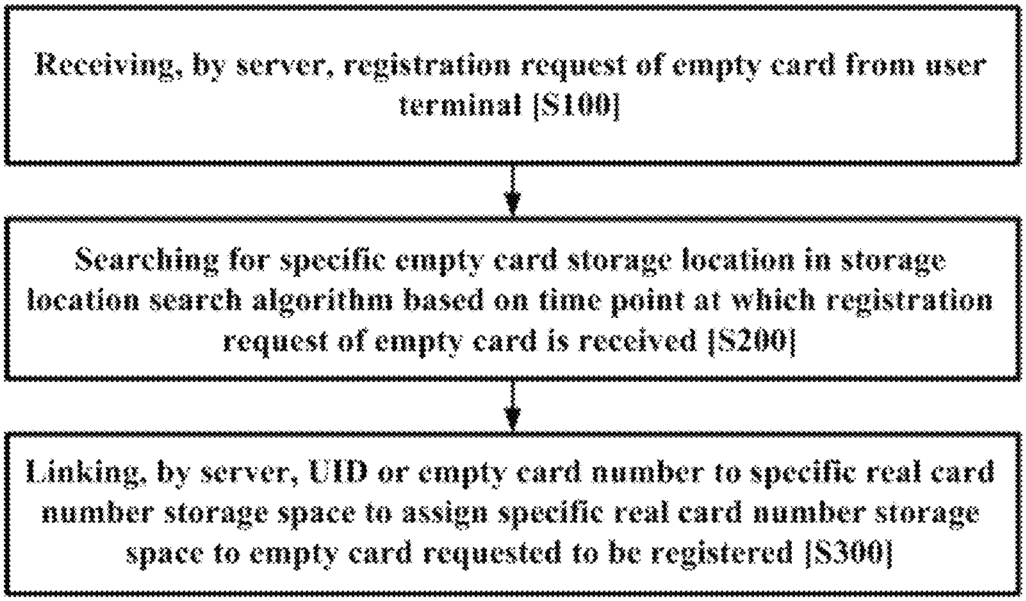
FIG. 9 is a flowchart of a financial transaction providing method using an empty card including an empty card registration procedure, according to an embodiment of the inventive concept.

FIG. 9 is a flowchart of a financial transaction providing method using an empty card including an empty card registration procedure, according to an embodiment of the inventive concept.

Referring to FIG. 9, according to an embodiment of the inventive concept, the financial transaction providing method using an empty card further includes an empty card registration procedure. That is, the financial transaction providing method using an empty card further includes operation S100 of receiving, by the server 30, the registration request of an empty card from the user terminal 20, operation S200 of searching, by the server 30, for a specific empty card storage location in a storage location search algorithm based on the time point at which the registration request of an empty card is received, and operation S300 of linking, by the server 30, the UID or the empty card number, which is assigned to the empty card storage location, to a specific real card number storage space to assign the specific real card number storage space to the user of the empty card requested to be registered or the corresponding empty card.

In operation S100, the server 30 receives the registration request of the empty card by receiving an empty card number and a combination serial number from the user terminal 20. That is, for the purpose of registering the purchased empty card 10 through an empty card-dedicated program (i.e., an application) embedded or installed in the user terminal 20, the user terminal 20 receives the empty card data from the empty card 10 through wireless communication (e.g., through NFC communication as the empty card is contacted). Herein, the empty card data may be data stored in the IC chip 110 of the empty card 10 and may include the empty card number, the serial number, or the like of the empty card. Afterward, the user terminal 20 combines the empty card serial number provided in the empty card 10 and the serial number of an application embedded or installed in the user terminal 20 to generate the combination serial number and provides the generated combination serial number and the empty card number to the server 30 to make a request for the registration of the empty card 10.

Afterward, in operation S200, the server 30 searches for the specific storage location in the storage location search algorithm, based on the time point at which the registration request of the empty card is received. That is, the server 30 searches for the location corresponding to the time point at which the registration is requested, on a track of the storage location search algorithm corresponding to a specific empty card-based financial transaction service. The server may, in advance, assign the UID to the point corresponding to the time point (or count) at which the registration of the empty card is requested and generates and assigns the UID being a specific code upon registering the empty card.

Afterward, in operation S300, the server 30 connects the specific real card number storage space to the UID or the empty card number assigned to the location corresponding to the time point at which the user terminal makes a request for the registration and assigns the real card number storage space to the empty card, the registration of which is requested, or the user holding the empty card. That is, the server 30 connects the real card number storage space to the UID for the payment process using the virtual card number and connects the corresponding real card number storage space to the empty card number of the empty card for the offline payment using the empty card itself. That is, the server 30 extracts the real card number in the real card number storage space connected to the UID or the empty card number to make an online or offline payment.

Afterward, the server 30 makes the payment using the UID depending on the operation illustrated in FIG. 6. The detailed description thereof will be duplicated with the description given with reference to FIG. 6, and thus is omitted.

Furthermore, as the server 30 connects the empty card number itself to the card number storage space matched to the empty card, even when a user makes a request for the payment through the POS device in offline by using the empty card 10 and thus the server 30 does not receive the virtual card number generated by the user terminal 20, the server 30 searches for the real card number storage space connected to the empty card number provided through the acquirer server. The server 30 may make a payment request or may perform a payment progress, using the real card number set as a basic card in the real card number storage space.

At this time, when the empty card number is entered through the online payment process instead of the virtual card number (i.e., when the empty card number is provided through a PG company), the server 30 may interrupt the corresponding payment request, thereby improving security and preventing crime.

Figure 10:
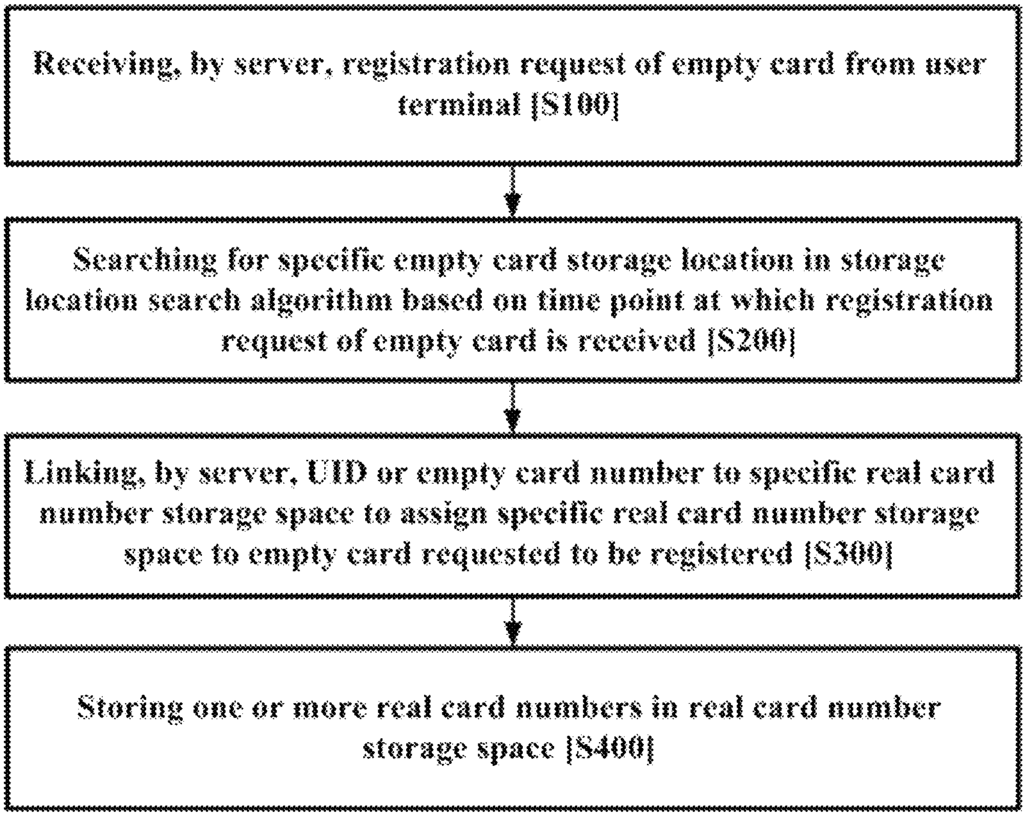
FIG. 10 is a flowchart of a financial transaction providing method using an empty card including a procedure of storing one or more real card numbers in a real card number storage space assigned to an empty card, according to an embodiment of the inventive concept.

FIG. 10 is a flowchart of a financial transaction providing method using an empty card including a procedure of storing one or more real card numbers in a real card number storage space assigned to an empty card, according to an embodiment of the inventive concept.

Referring to FIG. 10, according to an embodiment of the inventive concept, the financial transaction providing method using an empty card further includes operation S400 of storing one or more real card numbers in a real card number storage space.

In operation S400, the server 30 receives one or more real card numbers from the user terminal 20 to store the one or more real card numbers in the real card number storage space. The server 30 may receive real card information from the user through the application (i.e., the dedicated program of an empty card-based service) embedded or installed in the user terminal 20. In an embodiment, the user may provide the real card number to the server 30 by capturing the real card; in another embodiment, the user may enter the real card number to provide the real card number. At this time, the real card number may be provided as the image of the real card number on the application (i.e., the dedicated program of an empty card-based service) embedded or installed in the user terminal 20, may be provided as only the part of digits of the real card number, or may be provided as the identification number of the real card number, thereby improving the security.

In particular, the server 30 receives the virtual card number from the user terminal 20 to search for the real card number storage space corresponding to the empty card and receives a real card number to be registered additionally. As such, the server 30 searches for the empty card storage location by using a plurality of detailed codes in the virtual card number to extract the UID and searches for the real card number storage space based on the UID. The server 30 adds a new real card number received from the user terminal 20, to the card number storage area in the real card number storage space.

Furthermore, according to an embodiment, the server 30 encrypts and stores the real card number in the card number storage area, thereby doubly improving the security.

Figure 11:
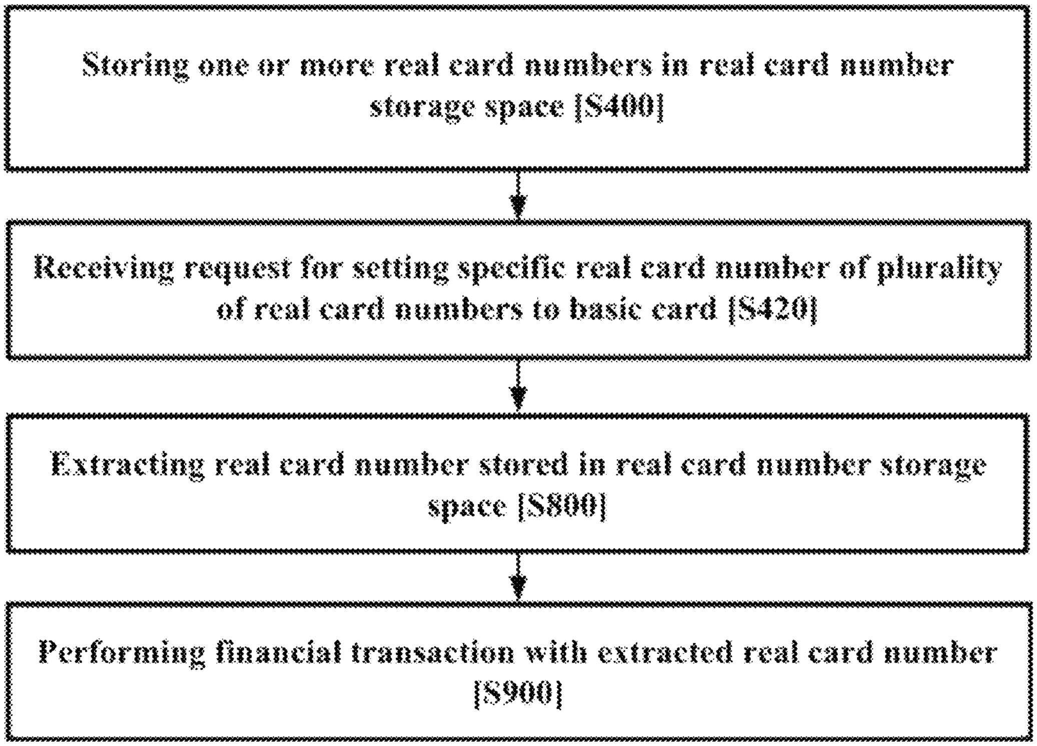
FIG. 11 is a flowchart of a financial transaction providing method using an empty card including a procedure of setting a basic card among a plurality of real card numbers stored in a real card number storage space assigned to an empty card, according to an embodiment of the inventive concept.

FIG. 11 is a flowchart of a financial transaction providing method using an empty card including a procedure of setting a basic card among a plurality of real card numbers stored in a real card number storage space assigned to an empty card, according to an embodiment of the inventive concept.

Referring to FIG. 11, according to an embodiment of the inventive concept, the financial transaction providing method using an empty card further includes operation S420 of receiving a request for setting a specific real card number of a plurality of real card numbers to a basic card.

In operation S420, the server 30 may request a user to set a basic card, when a plurality of real card numbers are stored in the real card number storage space. When receiving a request for setting a specific card of a plurality of real card to a basic card (i.e., a default card) from the user terminal 20 together with the virtual card number (e.g., the server 30 receives the identification number corresponding to the selected real card as the user selects a real card to be set as the basic card among a plurality of real card images displayed on the empty card-dedicated program in a user terminal), the server 30 searches for the UID of the empty card based on the virtual card number and extracts the real card number storage space connected to the UID. Afterward, the server 30 stores the identification number (i.e., the identification information of the basic card) corresponding to the basic card, the setting of which is requested, in a basic card setting area.

For example, when the real card, the identification number of which is ‘1’, is to be set as the basic card (i.e., the default card), the server 30 stores the identification information of the basic card as ‘1’ in the basic card setting area. Afterward, when a payment request is received from the user terminal 20, the server 30 identifies the identification information of the basic card, for example, ‘1’ in the basic card setting area and extracts the real card number, the identification number of which corresponds to ‘1’, in the card number storage area.

According to an embodiment, when only one real card number is stored in the card number storage area, the server 30 stores the corresponding real card number as the number of the basic card to perform a financial transaction.

Figure 12:
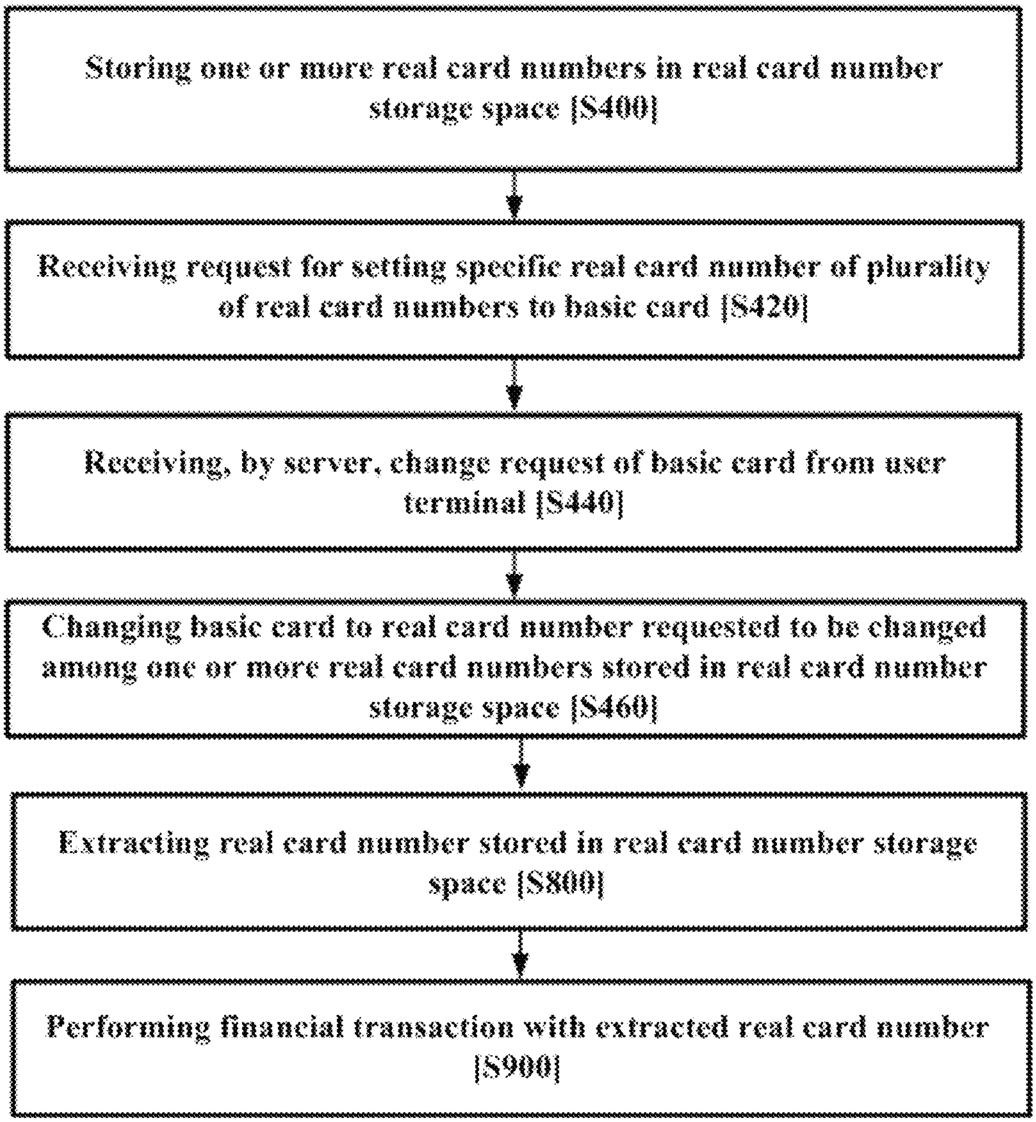
FIG. 12 is a flowchart of a financial transaction providing method using an empty card including a procedure of changing a basic card, according to an embodiment of the inventive concept.

FIG. 12 is a flowchart of a financial transaction providing method using an empty card including a procedure of changing a basic card (i.e., a default card), according to an embodiment of the inventive concept.

Referring to FIG. 12, according to an embodiment of the inventive concept, a financial transaction providing method using an empty card includes operation S440 of receiving, by the server 30, a change request of a basic card (i.e., a default card) from the user terminal 20 and operation S460 of changing the basic card to a real card number requested to be changed among one or more real card numbers stored in a real card number storage space.

In operation S440, when the user desires to change the basic card for the payment among real cards stored in the empty card, the user requests the server 30 to change the basic card together with the virtual card number. Herein, the user selects the basic card through the application (i.e., the dedicated program of an empty card-based service) embedded or installed in the user terminal 20, and then the user may make a request for a basic card change by selecting the image of a card or an identification number.

Afterward, in operation S460, the server 30 searches for the UID of the empty card 10 based on the virtual card number to extract the real card number storage space connected to the UID and changes the basic card in the real card number storage space. For example, when the identification number of a card preset to the basic card is ‘1’ and the identification number of the basic card requested to be changed by the user is ‘3’, the server 30 stores ‘3’ in the basic card setting area. Afterward, when a payment request is received from the user terminal 20, the server 30 identifies the identification information of the basic card, for example, ‘3’ in the basic card setting area and extracts the real card number, the identification number of which corresponds to ‘3’, in the card number storage area.

Furthermore, in another embodiment, the server 30 may connect a plurality of empty cards to one real card number storage space. That is, a first empty card and a second empty card may be connected to one real card number storage space in the server 30 and may be used.

In particular, when linking a plurality of empty cards to the same real card number storage space, the server 30 receives the virtual card number (i.e., the first virtual card number) associated with the preregistered first empty card from the user terminal 20 to search for the UID and searches for the specific real card number storage space. That is, the real card number storage space found using the first virtual card number is connected to the first empty card number and the first UID. Afterward, the server 30 receives the second empty card number or the second combination serial number, which are generated based on the second empty card data of the second empty card, from the user terminal 20. Afterward, the server 30 connects the second empty card number or the second UID to the real card number storage space connected to the first empty card number and the first UID. That is, when the user and the user’s family desire to perform a financial transaction using the empty cards, the user connects the second empty card to the real card number storage space, which is connected to the first empty card and which stores one or more real card numbers, to employ the second empty card. In particular, when the user that is employing the preregistered first empty card desires to purchase the second empty card and to additionally register the purchased second empty card, the server 30 receives the virtual card number of the first empty card from the user terminal 20 to search for the UID of the first empty card and searches for the real card number storage space of the first empty card. Moreover, the server 30 assigns the second UID on the storage location search algorithm corresponding to the second empty card type, based on the second combination serial number generated based on the second empty card data and the count value upon making a request for the second empty card registration. Moreover, the server 30 may connect the real card number storage space of the found first empty card to the second empty card number or the assigned second UID, and thus the user may register a plurality of empty cards for a single real card number storage space to conveniently employ the plurality of empty cards, without the need to separately generate the real card number storage space of the second empty card.

Furthermore, according to an embodiment, when a plurality of empty cards are connected to a single real card number storage space, the basic card may be set differently for each empty card. That is, in an embodiment, when a plurality of real card numbers are stored in the real card number storage space, the server 30 may set the basic card (i.e., a default card) of the first empty card and the second empty card to a single card or may set the basic card for each empty card. At this time, the basic card setting area stores basic card identification information for each empty card and the server may extract the basic card identification information matched to the empty card used when the payment is made using each empty card.

For example, when four real card numbers, the identification number of each of which is assigned to 1, 2, 3, or 4, is stored in the real card number storage space, the basic card of the first empty card may be set to the card, the identification number of which is '1', and the basic card of the second empty card may be set to the card, the identification number of which is '3'. According to another embodiment, a basic card may be set by separating two empty cards into online and offline cards. As such, empty cards are used for different purposes, and a financial transaction may be performed with a real card set depending on the purpose, thereby efficiently managing consumption.

According to an embodiment of the inventive concept, when operation S500 of receiving a virtual card number is set to a mode in which the empty card-dedicated program 21 stores empty card data provided from the empty card 10 in the user terminal 20, the server 30 may receive the virtual card number generated using the combination serial number stored after being previously generated by the user terminal 20, from the user terminal 20.

According to an embodiment, the server 30 may make a payment depending on a first mode or a second mode.

The first mode is a mode, in which the user contacts the empty card 10 to the user terminal 20 and the user terminal 20 always generates a new combination serial number and generates the virtual card number using the generated combination serial number whenever a user makes a request for the payment, for the purpose of making a payment. When a payment is made using the first mode, a virtual card number is generated using a new combination serial number, thereby enhancing the security.

On the other hand, the second mode is a mode in which a payment is made by generating the virtual card number using the combination serial number stored after being previously generated by the user terminal 20, without the need for the contact of the empty card to the user terminal 20 because the empty card data, that is, the empty card number and the serial number, which is provided by the empty card 10, is stored in the user terminal 20. When a payment is made using the second mode, the payment may be made by only the application installed in the user terminal 20 without the need to carry an empty card, thereby improving the convenience.

Furthermore, according to an embodiment of the inventive concept, a method for providing a financial transaction using an empty card may further include searching, by the server 30, for the real card number storage space based on the virtual card number or the UID transmitted from the user terminal 20 to disconnect the connection relationship with the corresponding empty card number.

For example, for the purpose of preventing other persons from making an offline payment request using the empty card 10 when the empty card 10 is lost, the connection relationship between the corresponding empty card number and the card number storage space needs to be disconnected. Accordingly, the server 30 may search for the real card number storage space of the corresponding empty card based on the virtual card number or the UID transmitted from the user terminal 20 at the request of the user to disconnect the connection relationship between the corresponding empty card number and the found real card number storage space.

In particular, when a user terminal (or an empty card-dedicated program) stores the UID, as the server 30 receives the UID from the user terminal 20, the server 30 may search for the card number storage space and may exclude the received UID and the empty card number corresponding to the UID from data capable of searching for the real card number storage space. Furthermore, for another example, in the case where the user terminal (or the empty card-dedicated program) does not store the UID, when the mode of user terminal is set to the second mode, the server 30 may receive the virtual card number of the empty card, the connection relationship of which is to be disconnected, and may exclude the UID found by the virtual card number and the empty card number corresponding to the UID, from data capable of searching for the card number storage space.

In some embodiments, the above-discussed method of FIGS. 6, 9, 10, 11 and 12, according to this disclosure, is implemented in the form of program being readable through a variety of computer means and be recorded in any non-transitory computer-readable medium. Here, this medium, in some embodiments, contains, alone or in combination, program instructions, data files, data structures, and the like. These program instructions recorded in the medium are, in some embodiments, specially designed and constructed for this disclosure or known to persons in the field of computer software. For example, the medium includes hardware devices specially configured to store and execute program instructions, including magnetic media such as a hard disk, a floppy disk and a magnetic tape, optical media such as CD-ROM (Compact Disk Read Only Memory) and DVD (Digital Video Disk), magneto-optical media such as floptical disk, ROM, RAM (Random Access Memory), and flash memory. Program instructions include, in some embodiments, machine language codes made by a compiler compiler and high-level language codes executable in a computer using an interpreter or the like. These hardware devices are, in some embodiments, configured to operating as one or more of software to perform the operation of this disclosure, and vice versa.

A computer program (also known as a program, software, software application, script, or code) for the above-discussed method of FIGS. 6, 9, 10, 11 and 12, according to this disclosure is, in some embodiments, written in a programming language, including compiled or interpreted languages, or declarative or procedural languages. A computer program includes, in some embodiments, a unit suitable for use in a computing environment, including as a stand-alone program, a module, a component, or a subroutine. A computer program is or is not, in some embodiments, correspond to a file in a file system. A program is, in some embodiments, stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program is, in some embodiments, deployed to be executed on one or more computer processors located locally at one site or distributed across multiple remote sites and interconnected by a communication network.

According to the disclosed embodiment, the inventive concept has the following various effects.

First, when a financial transaction request is made with an empty card after one or more real cards is linked to one empty card, a financial transaction is performed with a real card linked to the empty card. Accordingly, a user may conveniently perform online and offline payments with only one empty card without carrying a plurality of cards.

Second, because the user just carries only the empty card linked to the user's real card for the financial transaction, there is no risk of losing a real card and the financial transaction may be made securely.

Third, the virtual card number generating function is stored in only the virtual card number generating device (e.g., a user terminal) generating the virtual card number and an algorithm for searching for the real card number by using the virtual card number is added to only the device (e.g., a token service server, a finance company server, or the like) extracting a real card number, thereby preventing an algorithm for generating and verifying the virtual card number from being leaked.

Fourth, because the virtual card number is used in the same format as the real card number, the payment process using the real card number may be maintained. For example, in the case where the application providing a financial transaction service generates and provides a virtual card number that is not generated redundantly, because a POS device and a PG server are maintained as it is and transmit the virtual card number to the token service server or the finance company server, the token service server or the finance company server may search for the real card number corresponding to the virtual card number to make a payment. As such, a portion to be changed in the conventional process may be minimized to increase the security, and the user does not need to perform additional steps to improve security.

Fifth, as the redundant virtual card number does not appear within the specified period because a new virtual card number is generated for each unit count or as the order in which the virtual card numbers used when a virtual card number verifying device searches for the real card number is generated is randomized, the real card number is not leaked even when virtual card number is leaked.

Although the exemplary embodiments of the inventive concept have been described with reference to the accompanying drawings, it will be understood by those skilled in the art to which the inventive concept pertains that the inventive concept can be carried out in other detailed forms without changing the technical spirits and essential features thereof. Therefore, the above-described embodiments are exemplary in all aspects, and should be construed not to be restrictive.

What is claimed is:

1. A method for controlling a process related to financial transaction for online payment or offline payment using empty card number and virtual card number, performed by a server, the method comprising:
- receiving, from a user, a first request for the offline payment;
- in response to the first request, performing the steps comprising:
  - receiving the empty card number assigned to an IC chip of a card;
  - searching a real card number linked to the empty card number; and
  - performing the financial transaction for the offline payment based on the real card number; and
- receiving, from a mobile terminal, a second request for the online payment; and
- in response to the second request, performing the steps comprising:
  - receiving the virtual card number from the mobile terminal, the virtual card number is generated by a virtual card number generating function in an application installed in the mobile terminal based on card data stored in the card;
  - identifying at least one detailed code from the virtual card number;
  - determining a virtual card number generation function based on the identified at least one detailed code;
  - determining a search algorithm based on the determined virtual card number generation function;
  - searching a storage location in which the card is registered, based on the search algorithm;
  - searching a real card number storage space linked to a user identification (UID) assigned to the searched storage location; and
  - performing the financial transaction for the online payment based on the real card number stored in the searched real card number storage space.

2. The method of claim 1, wherein the at least one detailed code is generated based on a virtual security code included in the virtual card number,
- wherein the virtual security code is generated at a specific time using the card data stored in the card,
- wherein the at least one detailed code is generated per a unit count by the mobile terminal, and
- wherein the unit count is set to a specific time interval and is changed according to elapsing the specific time interval.

3. The method of claim 2, wherein the at least one detailed code includes a first code and a second code,
- wherein the virtual card number is generated by a combination of the first code and the second code based on a correlation between the first code and the second code, and
- wherein the server determines a search starting point corresponding to the first code and searches for the storage location according to a search path corresponding to the second code from the search starting point.

4. The method of claim 3, wherein the first code is generated based on the virtual security code and a first time when the card is registered with a virtual card number verifying device, and wherein the second code is generated based on the virtual security code.

5. The method of claim 4, wherein the first code is generated based on the virtual security code and a second time when the financial transaction for the online payment is requested from the user, and wherein the second code is generated based on the virtual security code and a difference between the first time and the second time.

6. The method of claim 2, wherein the virtual security code is generated based on the card data and a value of the mobile terminal.

7. The method of claim 6, wherein the virtual security code is generated based on a combination of a first serial number of the card included in the card data and a second serial number of the application installed in the mobile terminal.

* * * * *